(12) United States Patent
Tanii et al.

(10) Patent No.: US 6,524,737 B1
(45) Date of Patent: Feb. 25, 2003

(54) METHOD FOR CRUSHING CELL

(75) Inventors: Tadaaki Tanii, Takasago (JP); Satoshi Tsuzuki, Takasago (JP); Shiro Honmura, Takasago (JP); Takeo Kamimura, Takasago (JP); Kenji Sasaki, Kobe (JP); Masakazu Yabuki, Takasago (JP); Kiyonori Nishida, Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/555,264

(22) PCT Filed: Sep. 27, 1999

(86) PCT No.: PCT/JP99/05255

§ 371 (c)(1),
(2), (4) Date: Jul. 25, 2000

(87) PCT Pub. No.: WO00/19557

PCT Pub. Date: Apr. 6, 2000

(30) Foreign Application Priority Data

Sep. 28, 1998 (JP) .......................... 10-272973
Apr. 26, 1999 (JP) .......................... 11-117802

(51) Int. Cl.[7] .................................. H01M 10/54
(52) U.S. Cl. ........................................ 429/49
(58) Field of Search ............................ 429/49

(56) References Cited

U.S. PATENT DOCUMENTS 4,775,107 A * 10/1988 Heng et al. .................. 241/23
5,478,664 A * 12/1995 Kaneko et al. ............... 429/49
5,888,463 A * 3/1999 McLaughlin et al. ..... 429/49 X
6,150,050 A * 11/2000 Mathew et al. .............. 429/49

FOREIGN PATENT DOCUMENTS

| DE | 4419695 | * 8/1995 | ........... H01M/6/52 |
| WO | WO 94/25167 | * 11/1994 | ........... H01M/6/52 |

* cited by examiner

Primary Examiner—Stephen Kalafut
(74) Attorney, Agent, or Firm—Crowell & Moring LLP

(57) ABSTRACT

This invention provides a safe and efficient method of dismantling used lithium ion batteries. More specifically, the plastic cases which protect sealed battery cells are removed from the system in a stable and reliable fashion. Valuable materials such as lithium cobalt oxide, an oxide of a lithium-transition metal compound, aluminum and copper must be separated and recovered. The invention is distinguished by the fact that it entails the following processes. In the crushing process, the batteries are chilled to a temperature of −50° C. or lower. In this state they are repeatedly subjected to vibration and pressure by a number of objects whose rigidity and specific gravity are greater than those of the plastic. In this way the batteries are separated into sealed battery cells and plastic cases. In the heating process, the sealed battery cells separated in the process are heated to a temperature of at least 200° C. in a non-oxidizing atmosphere to separate mainly the organic materials. Finally, in one or more separation processes, the useless materials are removed and the targeted valuable materials are separated in a sequential fashion from the crushed fragments produced in the crushing process.

36 Claims, 27 Drawing Sheets

Fig. 13

(ROOM TEMPERATURE)

| SOLUTION HCl (%) / TIME (min) / pH | 10.0 | 5.0 | 2.0 | 1.0 |
|---|---|---|---|---|
|  | — | — | 0.17 | 0.45 |
| 0 | NO CHANGE | NO CHANGE | NO CHANGE | NO CHANGE |
| 5 | SMALL BUBBLES ON THE SURFACE | TINY BUBBLES ON THE SURFACE | NO CHANGE | NO CHANGE |
| 10 | ROUGH, MELTING ENDS | SMALL BUBBLES ON THE SURFACE | NO CHANGE | NO CHANGE |
| 15 |  | SMALL BUBBLES ARE PRODUCED | SMALL BUBBLES NO CHANGE ON THE SURFACE | NO CHANGE |
| 20 |  | PARTIALLY TORN OFF | SMALL BUBBLES NO CHANGE ON THE SURFACE | NO CHANGE |
| 25 |  | ROUGH START MELTING | SMALL BUBBLES NO CHANGE ON THE SURFACE | NO CHANGE |
| 30 |  | ROUGH START MELTING | SMALL BUBBLES NO CHANGE ON THE SURFACE | NO CHANGE |
| 35 |  | ROUGH MELTED END | SMALL BUBBLES NO CHANGE ON THE SURFACE | NO CHANGE |
| 60 (1Hr) |  |  |  | NO CHANGE |
| 120 (2Hr) |  |  |  | NO CHANGE |
| 240 (4Hr) |  |  |  |  |
| 360 (6Hr) |  |  |  |  |

Fig. 14

| SOLUTION HCl(%) | 10.0 | 5.0 | 2.0 | 1.0 | | | HEATED BY (95°C) | |
|---|---|---|---|---|---|---|---|---|
| TIME (min) pH | — | — | 0.17 | 0.46 | | 0.87 | — | 1.25 |
| 1 | MELTED DOWN COMPLETELY | | IN 1 MINUTE SMALL BUBBLES ON THE SURFACE | IN 1 MINUTE, SMALL BUBBLES, BUT NO CHANGE ON THE SURFACE | | NO CHANGE | | NO CHANGE |
| 2 | | MELTED DOWN COMPLETELY | IN 3 MINUTES MELTED DOWN COMPLETELY | START BUBBL-ING IN 3 MINUTES | | NO CHANGE | | NO CHANGE |
| 3 | | | ROUGH AND START MELTING | ROUGH, START MELTING | | NO CHANGE | | NO CHANGE |
| 4 | | | | IN 4 MIN. 30 SEC. MELT-ING DOWN ENDS | | NO CHANGE | | NO CHANGE |
| 5 | | | | | | SMALL BUBBLE | | NO CHANGE |
| 10 | | | | | | THIN SHEET HAS NO CHANGE | | NO CHANGE |
| 15 | | | | | | | | NO CHANGE |
| 20 | | | | | | ROUGH AND START MELTING | | NO CHANGE |
| 25 | | | | | | MELTED END | | NO CHANGE |
| 60 (1Hr) | | | | | | | | NO CHANGE |
| 120 (2Hr) | | | | | | | | NO CHANGE |
| 180 (3Hr) | | | | | | | | NO CHANGE |
| 240 (4Hr) | | | | | | | | NO CHANGE |

METHOD FOR CRUSHING CELL

TECHNICAL FIELD

This invention concerns a method to dismantle the sort of batteries with an enclosed cell which is protected by a plastic case. More specifically, it concerns a method to process nonaqueous solvent-type batteries which contain in their electrolytes, salts comprising cations and Lewis acid ions. This method is a safe and efficient way to process used lithium batteries which contain lithium hexafluorophosphate in their electrolytes.

For our purposes a nonaqueous solvent-type battery is a secondary battery which uses a nonaqueous solvent in its electrolytic solution and a light metal such as lithium in its cathode.

A nonaqueous solvent is any solvent other than water. The term is not limited in meaning to simple solvents other than water, but also includes mixtures of solvents.

TECHNICAL BACKGROUND

Recent concerns over the trend toward global warming have resulted in a call for more efficient use of electric power in order to avoid further proliferation of thermal generating plants. One way in which power might be used more efficiently would be to normalize power use by temporarily storing excess power at night and releasing it during the daytime. To bring this about, we must realize secondary batteries capable of storing such power. Concerns over air pollution, too, have led to a call for the development of large secondary batteries which can serve as the power supply for an automobile.

The demand for smaller secondary batteries has also been increasing yearly, both for their usefulness as backup batteries in computers and word processors and for their role as power supplies in small home appliances. In particular, the popularization of portable appliances and the improvement of their capabilities have produced a greater demand for small secondary batteries. With this expanding demand for batteries has come a serious concern that the chemical substances which make up the batteries be used efficiently and that measures be taken to prevent used batteries from posing an environmental hazard.

The sort of batteries now in demand are high-performance secondary batteries with capabilities equal to those of the appliances in which they are used. The most prominent examples of these to have been developed for the market are lithium ion batteries, which use an intercalation complex in which lithium ions have been embedded as the active material of their positive electrode and graphite as the active material of their negative electrode. Lithium, transition metals and other valuable substances which can be reused can be found in the lithium ion batteries. However, these batteries also contain extremely reactive substances like alkaline metals, which are used as the active material for their negative electrode, as well as electrolytes which contain substances likely to react with water.

Thus when we dismantle nonaqueous solvent-type batteries like lithium ion batteries, we must safely deactivate their active substances, including their active materials and their electrolyte solution, and at the same time safely and effectively recover any valuable materials which can be reused.

However, metallic lithium (which reacts with water to produce hydrogen) and organic solvents are used in the construction of lithium ion batteries, and they contain numerous other combustible compounds; so it is extremely difficult to recover valuable materials such as lithium cobalt oxide from these batteries.

In schemes disclosed in Japanese Patent Publications (Kokai) 6-346160 and 7-245126 to recover valuable materials including cobalt (actually, lithium cobalt oxide) from used lithium secondary batteries, the used battery is heated and crushed. The crushed materials are passed through a sieve and then separated by a magnet.

In Japanese Patent Publication 7-207359, the used lithium secondary battery is burned in a primary combustion process at 350 to 1000° C. It is then crushed and the resulting fragments are passed through a sieve and subjected to a secondary combustion process. The fired fragments are treated with an acid, the pH is adjusted to between 4 and 5.5 by an oxidizing gas which is blown into the acid, and the solution is filtered. An alkali is added to the filtrate, and the valuable materials are recovered from the resulting precipitate.

However, lithium ion batteries which are enclosed cells are enclosed in a protective plastic case. Their constituent materials, which include the active material in the negative electrode, the separator, the active material in the positive electrode, the electrolyte solution and the collector, are enclosed in a protective stainless or other type of steel case. If, using one of the techniques discussed above, a used lithium secondary battery of this sort is heated to between 350 and 1000° C. in a primary combustion process, the heat of combustion will cause the lithium cobalt oxide in the enclosed cell to decompose and emit oxygen. At the same time, the volatile (and flammable) solvent in the electrolyte solution will vaporize. The pressure of the vaporization may cause the cell case to burst open, in which case the vaporized and combustible organic solvent and oxygen will ignite. If the solvent and oxygen experience a sudden pressure spike while the case is still intact, they may even explode.

In Japanese Patent Publication 6-251805, a device such as a water jet is used to cut apart or make a hole in the case of a lithium battery. The lithium is processed by reacting it with water or some other reactant. The lithium, the hydrogen which is the other product of the reaction and the electrolyte solution are recovered. There is no combustion to cause a fire, and the materials are recovered safely and efficiently. To minimize combustion with the hydrogen when the battery case is cut open, the process is carried out in an atmosphere of inert gas. However, the use of a water jet requires that it be performed at normal temperatures. If any of the jet is at a lower temperature, and the battery is not fully discharged, the reactive lithium remaining in it will react violently with the moisture component in the air, producing combustible hydrogen gas, as will be discussed shortly.

In Japanese Patent Publication 6-3338352, three processes are used. In Process 1, the negative electrode containing lithium is exposed. In Process 2, the electrolyte is separated from the battery. In Process 3, to prevent a large quantity of hydrogen from being generated when the lithium and water or alcohol come in contact, the surface of the negative electrode which contains the lithium is treated with a solvent such as alcohol or water. Once this is completed, the inside of the negative electrode is also treated with a solvent.

In the prior art techniques described above, the process by which the negative electrode containing lithium is exposed consists of crushing the battery with a hammer crusher, a diamond cutter or a cutter-mixer. When the plastic and metal cases of a number of enclosed cells are cut open simultaneously as described above, the residue of the plastic cases sticks to the crushed fragments of the metal cell cases, and it is very difficult to remove. In addition, when a lithium ion battery which is not fully discharged is crushed, a short circuit will be created when its positive and negative electrodes come in contact with each other. The short circuit will generate Joule heat, causing the temperature inside the battery to rise. The lithium cobalt oxide comprising the positive electrode will decompose, producing oxygen. At the same time, the volatile (and flammable) solvent in the electrolyte solution will vaporize. If a spark is produced when the case is cut, the vaporized combustible organic solvent and the oxygen can ignite; or, if the pressure in the battery spikes abruptly, they can explode.

Another shortcoming of the prior art techniques described above is that a two-step treatment is required to prevent a large quantity of hydrogen from being generated when the lithium and water or alcohol come in contact. In order to execute the two-step process, the composition and quantity of the processing liquid must be controlled while the volume of hydrogen being produced is monitored. Controlling these variables is a complicated matter and does not solve the fundamental problem, which is the production of hydrogen.

We shall now discuss, from the viewpoint of difficulties experienced in the prior art, the configuration and basic problems of lithium ion batteries, since they are the kind of battery which this invention regards as most likely to be broken down so that their materials can be recycled.

Lithium ion batteries of the type described above comprise a number of cylindrical or rectangular enclosed cells (each a discrete battery) and a plastic case wrapped in wire which serves to connect the cells electrically to their control board. The plastic case makes up 20% of the weight of the battery unit.

Each enclosed cell consists of a positive electrode, a positive collector which is coated with the positive electrode, a negative electrode, a negative collector which is coated with the negative electrode a separator which is placed between the collectors, and a cell housing.

A thin sheet of a material such as aluminum foil is used as the positive collector; a thin sheet of a material such as copper foil is used as the negative collector.

The active material of the positive electrode consists of a simple or composite substance or a surface-active agent which is a complex metal oxide containing lithium. This complex metal oxide consists of a lithium ion such as lithium cobalt oxide and a specified metal.

The positive electrode is formed by coating the positive collector, a sheet of aluminum foil, with the active material. This material may be a substance to enhance electron conduction (a conductive substance) such as acetylene black adjusted by polyviridene chloride and n-methylviridone, a solvent.

The active material of the negative electrode is a substance which can take up and release lithium. Metallic lithium and lithium compounds are commonly used; however, lithium alloys and other materials are also found in these lithium compounds.

In addition to lithium alloys, other compounds which contain lithium include carbon materials with a structure of disordered layers and graphite. Even materials which do not contain lithium initially may be used as the negative electrode. In this case, lithium is produced in the material by an electrochemical process.

The negative electrode is formed by coating the copper foil which serves as the negative collector with an active material comprising a polyviridene chloride binder and a coating adjusted with n-methylpyloridone, a solvent.

The electrolyte solution may comprise a simple solvent such as ethylene carbonate, diethylene carbonate, dimethyl-carbonate or diethyl ether, or it may be a composite of two or more solvents. If the latter, it may be an organic electrolyte solution in which one or more fluorine compounds such as lithium phosphohexafluoride ($LiPF_6$) are dissolved.

For the separator, a porous resin film such as porous polypropylene film is used.

In the enclosed cell, the eddy structure which is created by interposing a separator between a positive electrode and a negative electrode, both of which are formed into sheets as described above, is enclosed not only by the organic electrolyte solution, but also by a cell housing comprising nickel-plated or stainless steel sheeting. Generally a safety valve is provided in the cell housing to prevent the cell from exploding when its internal pressure increases.

In addition to the primary lithium batteries discussed above, secondary batteries with a non-aqueous electrolyte have been developed which use metallic lithium in their negative electrode. However, the metallic lithium used in the negative electrode forms dendrites when the battery is repeatedly charged and discharged. This causes contact short circuits between the poles and shortens the life of the battery. Recently, to address this problem, non-aqueous electrolyte secondary batteries have been proposed which use carbonaceous substances as the active material in their negative electrode. In this case oxides of lithium compounds would be used as the active material in the positive electrode, so we could expect a safe and long-lasting battery with high energy density.

Because lithium ion batteries of the sort discussed above contain active substances and electrolyte solutions which are unstable when they interact with air, water or high temperatures, the following problems must be considered when such batteries are processed.

(1) Inside the used battery but outside the sealed cell are one or more plastic casings which protect the cell. These casings contribute 20% of the battery's weight. When recovering cobalt, the faster it is removed from the system, the greater the economy which is realized.

(2) If, for example, an undischarged lithium ion battery which uses lithium cobalt oxide as its positive electrode is crushed at normal temperature, its positive and negative electrodes will come into contact, causing a short-circuit current to flow. This current will generate Joule heat, and the temperature inside the battery will rise.

(3) When the temperature in the battery rises, the lithium cobalt oxide constituting its positive electrode will break down, releasing oxygen. At the same time, the volatile (i.e., flammable) solvent in the electrolyte solution will vaporize.

Furthermore, the vaporized combustible organic solvents and oxygen may be ignited by sparks produced when the battery is cut into, or the battery may explode due to the precipitous increase in its internal pressure. Even a discharged battery can ignite in this way causing a fire to occur.

(4) The activated lithium in an undischarged lithium ion battery will react vigorously with moisture in the air, releasing combustible hydrogen gas. This reaction can occur even in a discharged battery with the same result: combustible hydrogen gas will be released.

(5) The fluorine compounds in hexafluorophosphate lithium used as an electrolyte may react with moisture in the air, producing dangerous gases such as pentafluorophosphate and hydrogen fluoride. In the simple or compound solvent serving as the electrolyte in the lithium ion battery, which may comprise one or more of ethylene carbonate, diethylene carbonate, dimethylcarbonate or diethyl ether, an organic electrolyte is used in which one or more fluorine compounds such as lithium phosphohexafluoride ($LiPF_6$) are dissolved. The fluorine compound serving as the electrolyte, which may be lithium phosphohexafluoride, may react with moisture in the air to produce hydrogen fluoride, a harmful gas. Another fluoride compound which may produce noxious gases is arsenic phosphohexafluoride, which may produce arsenic fluoride or hydrogen fluoride. Such reactions may also occur in discharged nonaqueous solvent-type batteries, producing pentafluorophosphate, pentafluoroarsenic, or hydrogen fluoride.

(6) Lithium ion batteries have an electrolyte between a positive electrode comprising aluminum foil coated with lithium cobalt oxide and a negative electrode comprising copper foil, the collector, coated with graphite. The separator consists of polypropylene and polyethylene. The container which serves as the cell housing is made of copper or aluminum. When the battery is processed, all of these constituent materials must be separated and recovered in a reusable form. Among the more valuable of these materials, the most difficult to separate and recover are the lithium cobalt oxide which is coated onto the aluminum in the positive electrode and the copper which is coated with graphite in the negative electrode.

(7) In the secondary batteries used in laptops and cell phones (hereafter, we shall use the term "battery pack" for a battery enclosed in a plastic case and the term "battery cell" for one or more enclosed cells inside a plastic case), the plastic case which surrounds the sealed battery cell represents 20% of the total weight of the battery. As we have already mentioned, when recovering cobalt, the faster it is removed from the system, the greater the economy which is realized. However, as we shall discuss shortly, in the prior art a hammer crusher, a diamond cutter or a cutter-mixer was used to crush the plastic case and expose the sealed battery cell. When the battery was crushed, the residue of the plastic case would stick to the crushed fragments of the cell case, and it was very difficult to remove. In addition, when the battery cell was crushed in a subsequent process, the fragments of the case would bring the positive and negative electrodes in contact with each other, causing a short-circuit current to flow. This would cause the internal pressure in the cell to spike suddenly, possibly resulting in an explosion.

If the battery pack were combusted in order to burn off its plastic outer case, the combustion heat would break down the lithium cobalt oxide in its sealed cell and produce oxygen. At the same time, the volatile (flammable) solvent in the electrolyte solution would vaporize, and the vaporized and combustible organic solvent and oxygen would ignite, or if the internal pressure in the battery rose suddenly, they might even explode.

Thus it proved difficult using prior art techniques to crush the plastic case and sealed battery cell safely and efficiently, no matter whether the battery was crushed at ambient temperature or combusted.

In the forthcoming-technique described in WO 94/2517, a battery pack is separated into plastic case and battery cell by immersing the pack in a liquid nitrogen bath and reducing its temperature to approximately −100° C. It is then shocked once with an energy equivalent to that experienced in a fall from a height of 5 to 20 meters. More specifically, a rotor is used which has a rotary force of 700 to 900 rpm. This rotor, which has a scoop on it, accelerates the battery pack and causes it to collide with the wall of the tower. This breaks open the plastic case and releases the sealed battery cell.

However, it is difficult to apply in a stable fashion a single shock which delivers 100 J/kg to 600 J/kg of energy. As a result, this prior art technique is of limited application.

A technique which is similar to the prior art techniques and to that of this invention is disclosed in Patent Publication 10-241748. However, this prior art technique does not employ freezing to separate the sealed battery cell from its plastic case, but rather entails freezing a sealed battery cell with a safety valve once the plastic case has been removed. Its objective is thus different from that of the current invention.

DESCRIPTION OF THE INVENTION

The objective of this invention is to provide a safe and efficient process by which used lithium ion batteries could be dismantled. More specifically, the first objective is to remove from the system safely, certainly and as swiftly as possible the plastic case which encloses a sealed battery cell.

A second objective is to prevent a short circuit from occurring when a lithium ion battery is broken open in order to prevent accidents caused by excessive current flowing in the short circuit between the positive and negative electrodes.

A third objective is to prevent oxygen from being generated by the breakdown of cobalt lithium oxide, the material of the positive electrode, when the temperature spikes suddenly, and to prevent the volatile solvent in the electrolyte solution which is generated from vaporizing.

A fourth objective is to prevent the reactive lithium remaining in the lithium battery from reacting with the moisture component of the atmospheric air to produce combustible hydrogen gas.

A fifth objective is to prevent harmful gases from being produced by the reaction of fluorine compounds such as lithium phosphohexafluoride, an electrolyte, with the moisture component of the atmospheric air.

A sixth objective is dismantle the battery in such a way that the electrolyte, the solvent containing it and the solid materials can be separated completely from the crushed mixture.

With respect to a seventh objective, the solvent system and the system to process the solids must be two separate processing systems. Here the objective in separating the of solids is to remove the poisonous fluorine compounds and flammable solvent so that the solids could be broken down without having to consider possible dangerous interactions.

An eighth objective is to provide a processing method which would recover cobalt lithium oxide move efficiently and which would result in the recovered cobalt lithium oxide being more nearly pure.

A ninth objective is to provide a method to dismantle batteries containing salts composed of cations and Lewis acid ions, in particular lithium ion batteries, safely and efficiently. More specifically, it is the object to provide a method by which the lithium ion batteries could be processed safely. This method would prevent harmful gases from being generated from fluorine compounds such as lithium phosphohexafluoride which are used as electrolytes.

As will be made clear in the description of the invention and the explanation of the embodiments which follows, another objective of this invention was to provide a safe and efficient method to process lithium ion batteries in particular, since they contain a number of separable and recoverable materials of value, including lithium cobalt oxide, an oxide of a compound of lithium and a transition metal, aluminum and copper.

We shall next discuss the configuration of this invention.

This invention comprises a method to process a battery pack (hereafter, "battery") in which one or more sealed batteries (hereafter, "battery cells") are enclosed within a plastic case. It is distinguished by the fact that it comprises two processes. In the first, the battery is cooled to a temperature no greater than −50° C. and repeatedly subjected to vibration and pressure by a number of objects whose rigidity and specific gravity are greater than those of the plastic. In this way the battery is separated into a sealed battery cell and a plastic case. In the second process, the sealed battery cell separated in the process is heated to a temperature of at least 200° C. in a non-oxidizing atmosphere to separate mainly the organic materials.

As was explained in our discussion of the prior art, it is difficult to apply in a stable fashion a shock energy of 100 to 600 J/kg which is delivered in a single shock. Instead, the battery is repeatedly vibrated or squeezed to separate the plastic case from the sealed battery cell.

To be more specific, in the process to separate the case from the cell, the battery is cooled to a temperature no greater than −50° C., combined with a number of objects of greater rigidity and specific gravity than the plastic, and subjected to vibration. The vibration may be low-frequency vibration provided, for example, by a ball vibration device. In this case, the ball applying the vibration should have a volume ratio between 0.2 and 1 of that of the battery cell.

The process to separate the case from the cell might alternatively comprise cooling the battery to a temperature no greater than −50° C. and subjecting it to pressure and vibration provided by a number of objects of greater rigidity and specific gravity than the plastic. In this way the plastic case will be broken open and separated from the battery cell. More specifically, the objects which exert pressure upon the battery should be rods (including hollow rods) having a round, elliptical or square cross section, which are chilled to a temperature no greater than −50° C. and rotated. The vibration which these rods impart to the rotary space should be low frequency vibration.

This invention is applicable to a method of processing batteries comprising a sealed battery cell which is protected by a plastic case. It is by no means limited in its application to lithium ion batteries or batteries with non-aqueous solvents only.

If the case of a sealed battery cell is composed of a magnetic material, the plastic case may be separated from the sealed cell magnetically. If the case is composed of another material, for example aluminum, the case and cell may be separated using the difference in specific gravity between the two or by means of a sieve, whichever is convenient.

We shall now discuss the second objective of this invention.

As was discussed earlier, the positive collector in a lithium ion battery is made of a thin sheet of material such as aluminum foil, and the negative collector is made of a thin sheet of material such as copper foil.

When a battery cell containing these substances is combusted in an atmosphere of air, the aluminum of the positive electrode and the copper of the negative electrode within the cell are oxidized and become aluminum oxide and copper oxide. Because the oxidized aluminum and copper are brittle, particles of these substances will come away when the particles of lithium cobalt oxide which are stuck to the foil serving as a positive collector are peeled away. These particles of aluminum and copper oxide contaminate the cobalt lithium oxide which is recovered, adversely affecting the purity of the recovered product.

In Japanese Patent 10-241748, a technique is disclosed by which the sealed battery cell is crushed while its temperature is maintained below the melting point of the electrolyte solution.

In this prior art technique, when the sealed battery cell is chilled and crushed, the following problems are observed.

(1) Sealed battery cells contain polyethylene or polypropylene separators which constitute approximately 0.2 of their comparative weight. In order to deal with these substances efficiently in a later process, a large volume of equipment is required.

(2) It is difficult to completely separate metal components from polyethylene or polypropylene resin components simply by chilling and crushing the battery.

The second process of the present invention, then, is to heat the sealed battery cell separated from its case in the first process to a temperature of at least 200° C. in a non-oxidizing atmosphere while employing a safety valve on the cell. This will serve to separate mainly the organic materials from the rest of the battery.

To completely remove the organic resin component, the battery should be heated to a temperature of at least 500° C. To minimize the presence of dioxins in the exhaust gas, it should be heated to a temperature of at least 800° C.

The non-oxidizing atmosphere may be either a vacuum or an atmosphere of inert gases.

With this invention, as can be seen in FIG. 1 or FIG. 7, the sealed battery cell is heated to at least 200° C. in a vacuum or an atmosphere of inert gases. The material constituting the separator, whether polypropylene or polyethylene, the lithium phosphohexafluoride used as the electrolyte, and the ethylene carbonate, diethylene carbonate, dimethyl carbonate or diethyl ether used as the solvent, that is to say, all the organic solvents and organic resins, will undergo pyrolysis. The products of this pyrolysis will escape and be dispersed upward through the safety valve of the battery cell. The gases dispersed at this time will contain combustible organic solvents which can easily ignite; however, the vacuum or atmosphere of inert gases lacks any hydrogen to ignite the solvents or cause them to explode if there is a sudden increase in the internal pressure of the battery.

Such an atmosphere will also prevent any reactive lithium remaining in an undischarged lithium ion battery from reacting.

Furthermore, the aluminum foil coated with lithium cobalt oxide which serves as the positive electrode and the copper foil coated with graphite which serves as the negative electrode will also have no opportunity to oxidize. Since the aluminum and copper foil in the battery cell will not be oxidized, they will not become brittle. When the particles of lithium cobalt oxide which are stuck to the aluminum foil are peeled off, the aluminum will not flake away, but will remain in the state of foil or metallic elements (even if in a molten state). This greatly facilitates the recovery of lithium cobalt oxide and enhances the purity of the recovered product.

In other words, one of the distinctive features of this invention is that when the non-oxidizing atmosphere is a vacuum, the organic materials, such as the products of pyrolysis of the organic solvents and resins separated by heating the battery, are recovered by cooling the battery.

Another distinctive feature of this invention is that when the oxidizing atmosphere consists of an inert gas such as nitrogen, helium, argon, or neon, the liquid or solid organic materials, which remain when the gaseous materials are separated by heating the battery, are heated to decompose in an atmosphere of inert gases or other non-oxidizing gases.

The invention disclosed in claim 5 of this application is the method by which the battery is dismantled, given in the order in which the processes are executed.

This method is distinguished by the fact that it entails the following: a process in which the battery is broken open to separate the sealed battery cell from its plastic case; a process in which mainly the organic materials are separated from the sealed battery cell after the cell has been removed from its case in the preceding process; and one or more processes in which the useless materials are removed and the targeted valuable materials are separated in an orderly fashion from the crushed fragments produced in the crushing process.

The invention disclosed in claim 6 of this application is distinguished by the fact that ultrasonic or ball vibration is employed to peel the active materials of the positive (or negative) electrode off the metal foil.

The invention disclosed in claim 7 of this application is distinguished by the fact that the active materials of the positive (or negative) electrode are peeled off the metal foil by a stripping agent or by a combination of the stripping agent and a means of inducing vibration.

In the invention disclosed in claim 8 of this application, the active materials of the positive (or negative) electrode are separated from the metal foil by dissolving the foil in a strongly acidic or alkaline solution.

The valuable lithium cobalt oxide and spheroidal graphite are separated from the metal foil, whether aluminum or copper, by the means. However, because the lithium cobalt oxide and spheroidal graphite are in the form of microscopic particles, their subsequent handling in order to achieve combustion is problematical.

For this reason the current invention provides that after the particulate substances from the active materials of the positive and negative electrodes are separated from the metal foil and passed through a sieve, they undergo size enlargement.

With this invention, the particles of the lithium cobalt oxide and spheroidal graphite are formed into units resembling charcoal briquets to facilitate their subsequent combustion.

The combustion, of course, is not compulsory. As is disclosed in claim 15 of this application, the particulate matter containing the metal foil and the active material of the positive or negative electrode may be separated by passing it through a sieve. The material recovered from the sieve may then be separated by sedimentation so that the carbon may be removed and the lithium cobalt oxide recovered.

In this case, it is useful to include a process in which the suspended carbon is removed from the water remaining from the sedimentation process. It may be that among the substances recovered by the sedimentation process there is an ion solution of either fluoride or phosphate ions. In this case, once the carbon has been removed by a suspension process, as will be discussed shortly, a fixative such as calcium hydroxide should be added to the ion solution to fix those ions.

The processing system for the solid materials, namely the aluminum or copper foil and the resins containing valuable materials such as lithium cobalt oxide and spheroidal graphite, must be entirely separate from the processing system for the solvent. In particular, when processing the solid materials, the harmful fluorine compounds in the electrolyte and the flammable solvent must first be removed so that the solids can be broken down without having to worry about the influence of potentially dangerous components.

With this invention, the process in which the targeted valuable materials are separated should entail a subprocess in which the lithium hexafluorophosphate, a harmful substance, is dissolved in an aqueous solution. The lithium hexafluorophosphate dissolved in the aqueous solution should be fixed as will be described shortly.

That is to say, it is a distinctive feature of this invention that the lithium hexafluorophosphate separated in the specified process is broken down into fluoride and phosphate ions through the mediation of a heated acidic aqueous solution. The ions in the solution are then fixed by adding a fixative such as calcium hydroxide to the solution.

In the prior art techniques disclosed in Japanese Patent Publications 6-346160 and 7-245126, valuable materials such as lithium cobalt phosphate are recovered from used lithium secondary batteries as follows. The used lithium secondary battery is combusted and then crushed. The crushed fragments are separated by a sieve, and lithium cobalt phosphate is recovered below the sieve. Because the particles of lithium cobalt phosphate are of such small diameter, however, they tend to adhere to the impurities which remain in the sieve, resulting in incomplete recovery when a sieve is the only means of separation.

To address this problem, the current invention features the following process. The resin component is removed from the battery by a heating process, and the remaining materials are washed in water. The active material of the positive or negative electrode, which consists of microscopic particles of lithium cobalt oxide, is dispersed in the water and then recovered from this dispersed state.

Another distinctive feature of the current invention is that the ion-rich gas is not fixed via the wet process, but by a dry process such as one involving a bag filter. More specifically, the harmful materials such as lithium hexafluorophosphate are broken down in the heating process into an ion-rich gas containing fluorine and phosphate ions. The ion-rich gas is fixed by a dry process in which it is forced into contact with a fixative such as powdered calcium hydroxide. This is a sub-process of the process by which the targeted valuable materials are separated from the worthless materials.

Because this invention entails a dry process such as bag filtration, it simplifies the handling of the materials and allows a smaller volume of equipment to be used.

In the process to separate the targeted valuable materials, this invention allows the iron component to be removed magnetically once the particulate mixture containing the metal foil and the active material of the positive or negative electrode has been separated by a sieve.

With this invention, the addition of the magnetic separation process allows us to remove any iron which may be intermixed with the recovered material and so obtain a lithium cobalt oxide which is more nearly pure.

There are some applications which require that the recovered lithium cobalt oxide contain iron. In such cases, the magnetic separation process can be omitted.

In the invention we have been discussing, the lithium hexafluorophosphate solution resulting from heating the battery, processing the exhaust gases and then separating the components by immersing them in a water bath produces a stable aqueous solution. To be more specific, because the materials remain stable in solution without being ionized, we cannot produce a stable $CaF_2$ and $Ca_3(PO_4)_2$ by adding calcium hydroxide $Ca(OH)_2$ to the solution. In other words, we cannot fix the ions.

If we add acid to the lithium hexafluorophosphate solution, thereby maintaining the acidity of the aqueous solution, we can investigate accelerating the decomposition as in Formula 1 below (hydrolysis). However, even if we add the acid at ambient temperature or increase the concentration of the acid, it is clear that the decomposition (i.e., hydrolysis) can scarcely be accelerated. And using a more concentrated acid causes problems with respect to corrosion of the equipment and safety.

$$LiPF_6 + 5H_2O \rightarrow LiOH + HF + PO(OH)_3 \quad 1)$$

The results of various investigations led the present inventors to believe that by heating the acid, or to be more specific, by using an acid solution which has been heated to between 65 and 100° C. (i.e., to a temperature at which it will not boil) we can accelerate the (hydrolytic) decomposition substantially.

The acid used in this invention must have a higher ionic strength than the acid produced by the hydrolysis (according to Formula 1, HF (hydrogen fluoride)). FIG. 17 shows a graph reproduced from *The Handbook of Chemistry, Fourth Revised Version of the Basic Edition, Part II* (Compiled by the Chemical Society of Japan), page 323, which gives the relationship between the concentration of an acid solution and its ionic strength. From the graph we can see that acids with a higher ionic strength than HF include $HClO_4$, HCl and $H_2SO_4$. If the HF is of a lower concentration, $HNO_3$ will be included in this range as well.

With these acids, even a dilute solution will have a higher ionic strength than HF, and hydrolysis as in the Formula 1 will be effectively accelerated.

By adding calcium hydroxide $Ca(OH)_2$ to the solution once the hydrolysis has been effected, we can produce a stable $CaF_2$ and $Ca_3(PO_4)_2$ as in Formulas 2 and 3.

$$Ca(OH)_2 + HF \rightarrow CaF_2 + 2H_2O \quad 2)$$

$$3Ca(OH)_2 + 2PO(OH)_3 \rightarrow Ca_3(PO_4)_2 + 6H_2O \quad 3)$$

Thus the acid introduced to accelerate the hydrolysis should be a dilute solution of a strong acid such as dilute hydrochloric acid or alternatively, dilute sulfuric acid or dilute nitric acid. The dilute hydrochloric acid should be heated to at least 65° C., ideally to between 90 and 100° C.

The invention disclosed in claims 23 through 26 of this application relates primarily to a method for processing lithium ion batteries which contain lithium hexafluorophosphate in their electrolyte. However, batteries which contain, in their electrolytes, salts comprising cations and Lewis acid ions also fall within the range of applicability.

In addition to lithium ions ($Li^+$), the cations which may serve as salts in the electrolyte include sodium ions, potassium ions and tetraalkylammonium ions. Lewis acid ions which may serve as salts in the electrolyte include $BF^{4-}$, $PF^{6-}$, $AsF^{6-}$ and $ClO^{6-}$. The salts comprising these cations and Lewis acid ions should be heated under reduced pressure so as to effectively remove all water and oxygen before they are used as electrolytes.

This invention employs a water bath as a means of separating the salt component of the battery. The process is distinguished by comprising the following steps. In the method of processing the battery, the crushed fragments of the battery which contain the salts are immersed in water, and the salts are separated and go into an aqueous solution. A heated acid solution is added to the aqueous solution containing the salts to accelerate the hydrolysis of the Lewis acid ions. A fixative such as calcium hydroxide is added to the ion solution to fix the ions. More specifically, in the method of processing lithium ion batteries which contain lithium hexafluorophosphate in their electrolyte, the crushed fragments of the battery which contain the lithium hexafluorophosphate are subjected to a specified separation process in which heat is applied, the exhaust gases are processed and the fragments are immersed in a water bath. A heated acid solution is added to the aqueous solution containing the lithium hexafluorophosphate which has been separated into the water. The lithium hexafluorophosphate is hydrolyzed into fluorine ions and potassium ions, and a fixative such as calcium hydroxide is added to the ion solution to fix the ions.

BRIEF EXPLANATION OF THE DRAWINGS

FIG. 13 shows the relationship between the concentration of hydrochloric acid HCl and the rate at which the aluminum foil dissolves when the hydrochloric acid is at ambient temperature.

FIG. 14 shows the relationship between the concentration of hydrochloric acid HCl and the rate at which the aluminum foil dissolves when the hydrochloric acid is heated to 95° C.

PREFERRED EMBODIMENTS

In this section we shall give a detailed explanation of a number of preferred embodiments of this invention with reference to the drawings. Whenever the shapes, relative positions and other aspects of the parts described in the embodiments are not clearly defined, the scope of the invention is not limited only to the parts shown, which are meant merely for the purpose of illustration.

Figure 1:
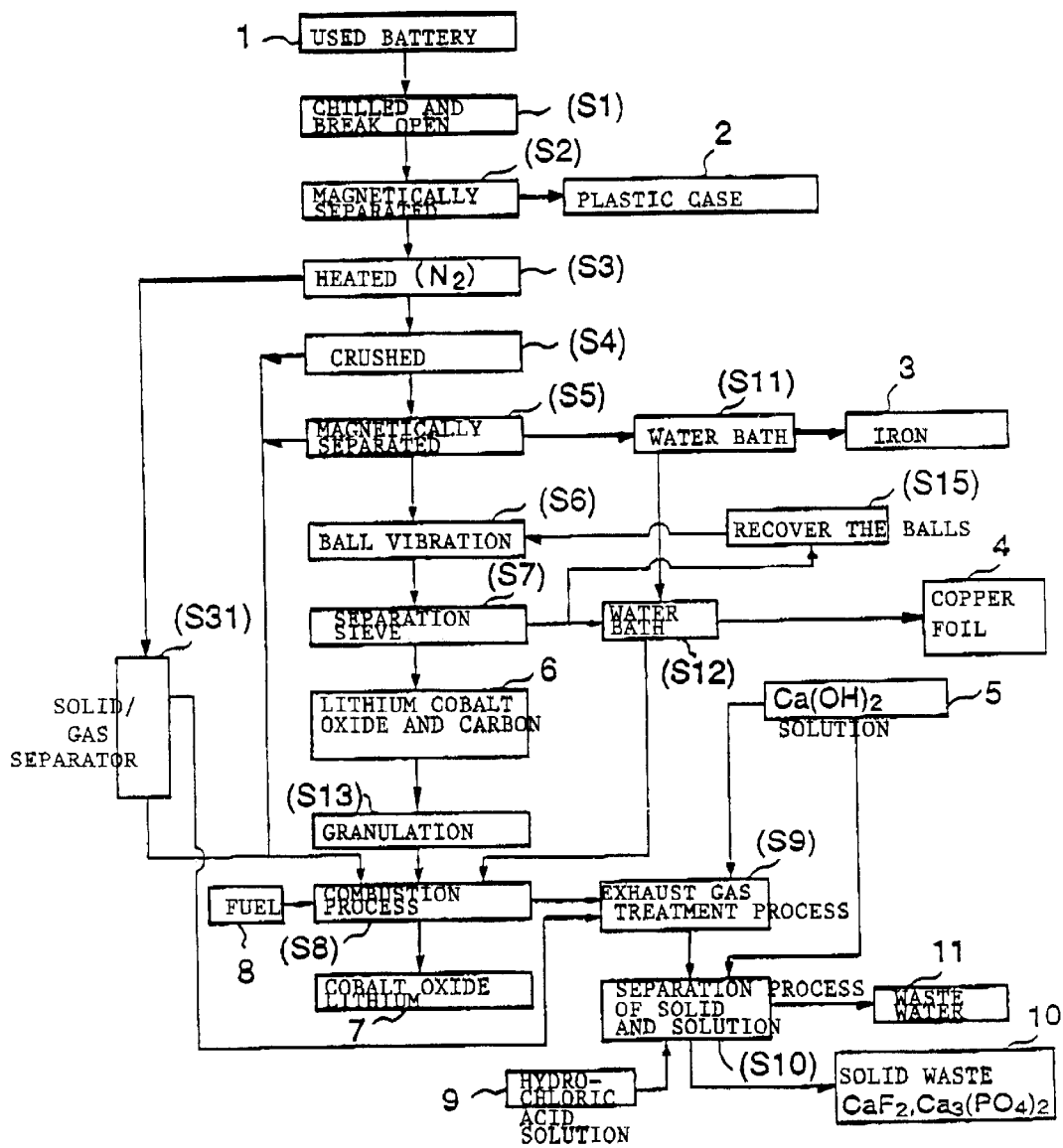
FIG. 1 is a flow chart of a process to dismantle lithium ion batteries which is related to the first preferred embodiment of this invention. In it, a process to increase the size of the particles is executed before the combustion process.

FIG. 1 is a flow chart of a process to dismantle lithium ion batteries which is related to the first preferred embodiment of this invention. A process to increase the size of the particles is executed before the combustion process, and the metal foil is flaked off by means of ball vibration.

The target battery packs for this embodiment are secondary lithium ion battery packs (hereafter referred to as "batteries" or "secondary batteries") in which a number of sealed battery cells with safety valves are enclosed in a plastic case. The plastic case represents 20% of the weight of the battery pack. Secondary lithium ion batteries are widely used in laptop computers and cell phones and are doubtless familiar enough to readers that we need not illustrate them here. The positive electrode consists of aluminum foil coated with an active material such as lithium cobalt oxide, applied with a coating agent. The negative electrode is formed by coating a copper foil with an active material such as graphite, applied with a coating agent.

The electrolyte solution may comprise a simple solvent such as ethylene carbonate, diethylene carbonate, dimethyl carbonate or diethyl ether, or it may be a composite of two or more solvents. If the latter, it may be an organic electrolyte solution in which one or more fluorine compounds such as lithium hexafluorophosphate ($LiPF_6$) are dissolved. For the separator, a porous resin film such as porous polypropylene film is used.

In the sealed cell, the eddy structure which is created by interposing a separator between a positive electrode and a negative electrode, both of which are formed into sheets as described above, is enclosed not only by the organic electrolyte solution, but also by a cell housing comprising nickel-plated stainless steel sheeting. Generally a safety valve is provided in the cell housing to vent gases.

We shall explain the process of dismantling a secondary lithium ion battery conforming to this description with reference to FIG. 1.

First, the used battery 1 is chilled to −50° C. or lower in the first process (S1). Rod or ball vibration and pressure cause plastic case 2 to break open, and the sealed battery cell 1a which is inside used battery 1 is released from plastic case 2.

Figure 8:
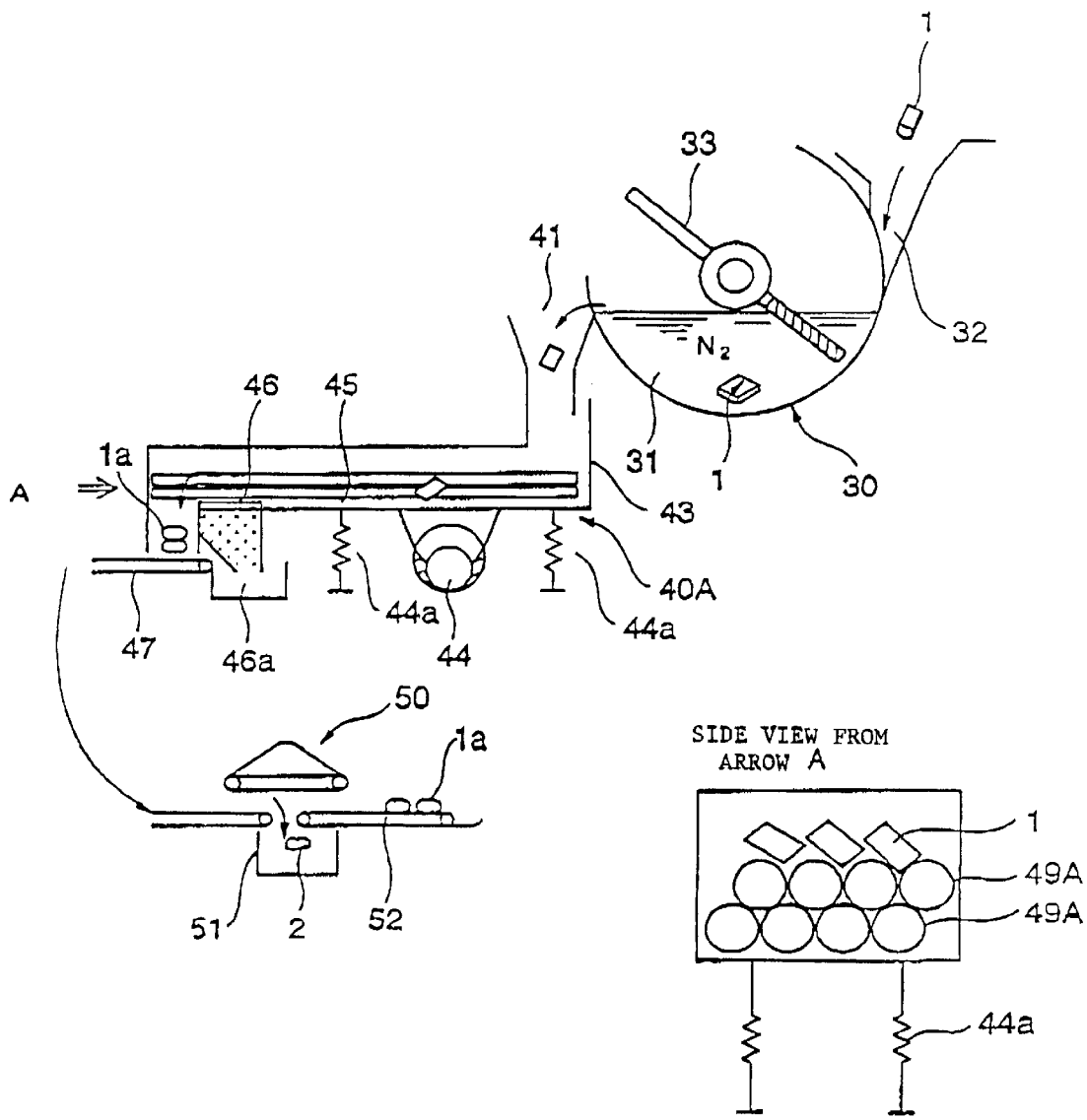
FIG. 8 is a rough sketch of a device to chill and break open the battery in order to separate the sealed battery cell from its plastic case. (This is Process 1 in FIG. 1.) The cell is separated from its case by the vibration imparted by a rod.
Figure 9:
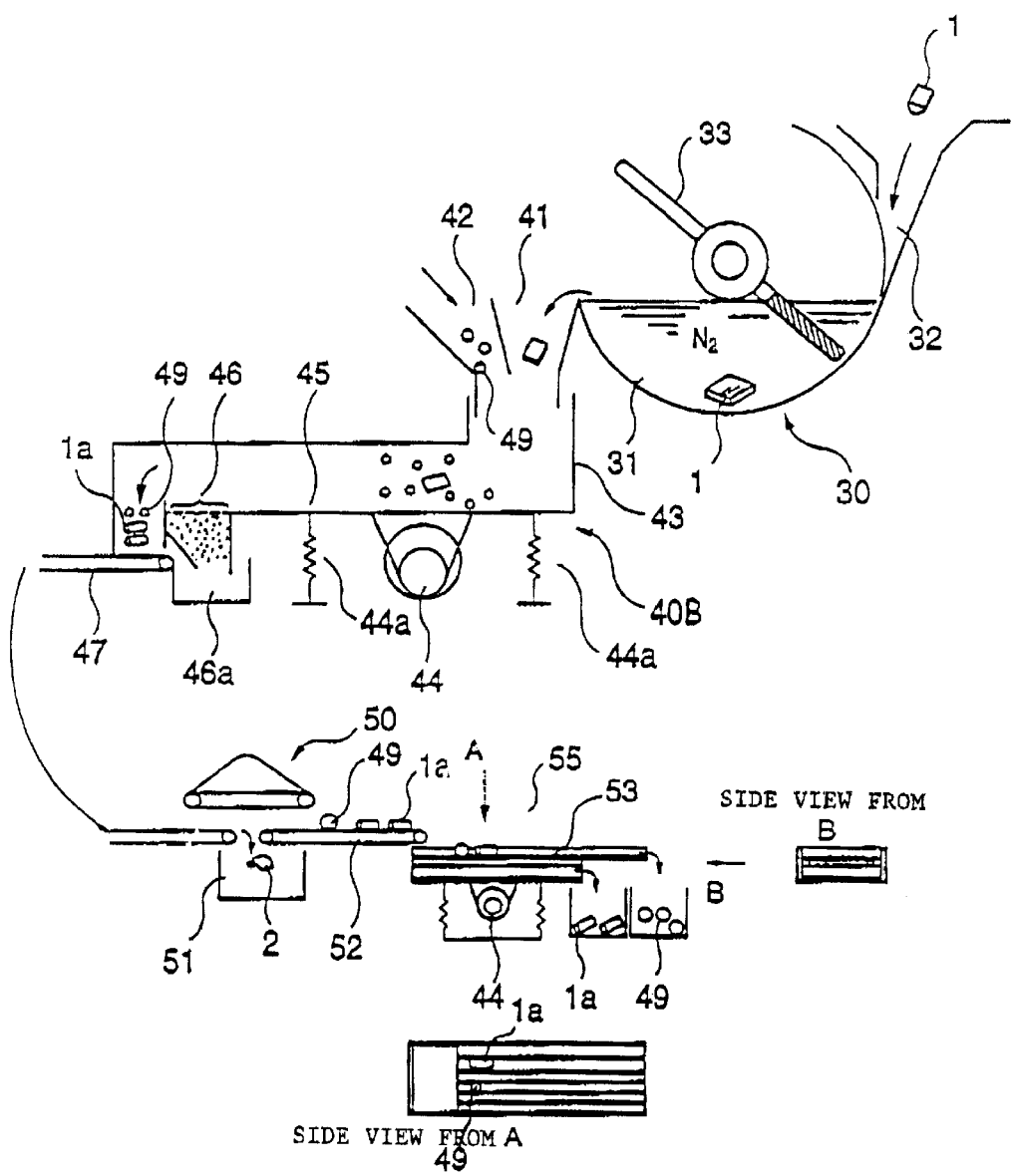
FIG. 9 corresponds to FIG. 8 but uses ball vibration to separate the cell from the case.

We shall explain the configuration of the device used for this purpose with reference to FIGS. 8 and 9.

FIG. 8 is a rough sketch of a device to chill and break open the battery pack in FIG. 1 in order to separate the sealed battery cell from its plastic case. The cell is separated from its case by the vibration imparted by a rod. FIG. 9 corresponds to FIG. 8 but uses ball vibration to separate the cell from the case.

In FIG. 8, 30 is the device to chill the battery. The used battery 1 enters the device through entry port 32 and is submerged in liquid nitrogen 31. It is chilled to −50° or lower, and rotary blade 33 propels it through discharge port 41. The battery then enters device 40A, where it is subjected to continuous rod vibration.

As viewed from point A, the rod vibration device 40A has eight stainless steel rods 49A with diameter of 25 mm stacked in chamber 45 in several horizontal rows. Vibration generator 44 is actuated with batteries 1 and rods 49A interspersed. Chamber 45, which is supported by spring 44a, is vibrated, and used batteries 1 are broken open. The fragments resulting from the process fall through perforated screen 46 into receptacle 46a. From the discharge port, they are transported via conveyor belt or vibrating sieve 47 to magnetic separator 50. The batteries must be chilled to below −50° C. because the melting point of the diethyl carbonate, the organic solvent inside the battery cell, is −43° C.

The rods need not be made of stainless steel, as long as they are of greater rigidity and specific gravity than the plastic case. The rods which exert pressure on the batteries may have a round, elliptical or square cross section, and they may be hollow. The vibration causes the rods to rotate and to become chilled to a temperature no greater than −50° C. The vibration is set to a total amplitude of 48 mm, a frequency of 20 Hz and a period of 1 to 3 minutes.

Magnetic separator 50 allows the plastic cases 2 which were broken open and separated from the sealed cells in the previous process to fall into receptacle 51, while the magnetic materials, namely sealed battery cells 1a, are transported to the location of the next process via conveyor belt 52.

FIG. 9 shows the interior of ball vibration device 40B, which employs vibrating balls rather than vibrating rods to separate the plastic cases from the battery cells. In the ball vibration device 40B, steel balls 49 are introduced via entry port 42. With batteries 1 and balls 49 interspersed, vibration generator 44 is actuated. Chamber 45, which is supported by spring 44a, is vibrated, and used batteries 1 are broken open. The fragments resulting from the process fall through perforated screen 46 into receptacle 46a. From the discharge port, they are transported via conveyor belt or vibrating sieve 47 to magnetic separator 50. The batteries must be chilled to below −50° C. because the melting point of the diethyl carbonate, the organic solvent inside the battery cell, is −43° C.

As long as the balls 49 are of greater rigidity and specific gravity than the plastic case, they may be made of stainless steel, zirconia, or some other material. If the balls are of a diameter of 35 mm, at least ten should be used for each battery. Their vibration is set to a total amplitude of 48 mm, a frequency of 20 Hz and a period of 1 to 3 minutes, just as in the rod vibration device. Both of the devices should use low frequency vibration with a frequency no greater than 20 Hz.

In this embodiment, magnetic separator 50 allows the plastic cases 2 which were broken open and separated from the sealed cells in the previous process to fall into receptacle 51, while the magnetic materials, namely balls 49 and sealed battery cells 1a, are transported to size sorting device 55 via conveyor belt 52. In the size sorting device 55, vibration generator 44 imparts vibration to chute 53, which has guide rails to form channels of two specified diameters whereby to separate sealed cells 1a from balls 49.

In both of the devices, the sealed cells 1a which are inside the batteries are removed from their plastic cases 2. Magnetic separator 50 takes advantage of the fact that the case of a sealed cell is ferrous, and so magnetic, to remove sealed cells 1a from plastic cases 2 in magnetic separation process S2. However, rod vibration device 40A is preferable in that it does not require the process to recover the balls.

Both devices are also equivalent in that they break open only the plastic case 2 without damaging the sealed cell 1a, which is routed out of the system while still intact.

In the next step, the sealed cells 1a, now freed from the plastic cases 2, are heated in an atmosphere of inert gases (S3). The organic solvents and resins which vaporize inside the cells are vented through the safety valve provided on each sealed cell. Once the volatile components and sources of poisonous gases have been removed, the cells are crushed using the customary procedure.

In heating process S3, the sealed battery cells are placed in a rotary kiln in an atmosphere of inert gas (nitrogen, in this case) and baked (pyrolyzed) for, say, ten minutes, at a temperature of at least 500° C., and ideally at least 850° C. (to remove dioxins). The organic solvents and resins which are gasified in the course of the heating process are vented through safety valves provided on the sealed cells. Once the volatile components and sources of poisonous gases have been removed, the diffused gases produced by the heating process are routed to a solid/gas separator (S31) comprising a cooling device and a filter. The solidified materials (including liquids) such as organic resins separated in the separator (S31) are then recovered without further processing or routed to a combustion process (S8); and the exhaust gases, comprising volatile components and poisonous gases, are routed either through the combustion process (S8) and a treatment process (S9), or through the treatment process (S9) alone.

Because the volatile components and poisonous gases have been vented from them, the sealed battery cells which remain in the rotary kiln at the end of the baking process may be crushed (S4) at ambient temperature without further processing.

In this embodiment, then, when the sealed battery cells are heated in an atmosphere of inert gases to a temperature of at least 500° C., the material constituting the separator, whether polypropylene or polyethylene, the lithium hexafluorophosphate used as the electrolyte, and the ethylene carbonate, diethylene carbonate, dimethyl carbonate or diethyl ether used as the solvent, that is to say, all the organic solvents and organic resins, will be vented through the safety valve of the battery cell. The gases dispersed at this time will contain combustible organic solvents which can easily ignite; however, the atmosphere of inert gases lacks the hydrogen necessary to ignite the solvents or cause them to explode if there is a sudden increase in the internal pressure of the battery. Such an atmosphere will also prevent any reactive lithium remaining in an undischarged lithium ion battery from reacting.

Furthermore, the aluminum foil coated with lithium cobalt oxide which serves as the positive electrode and the copper foil coated with graphite which serves as the negative electrode will also have no opportunity to oxidize. Whether in their original state as foil or in a molten state if heated to high temperature (the melting point of aluminum is 660° C. and that of copper is 1080° C.), these metals will not undergo oxidation. When the particles of lithium cobalt oxide which are stuck to the aluminum foil are flaked off in the ball vibration process (S6) which will be discussed shortly and the sieving process (S7), the aluminum will not flake away, but will remain in the state of foil or metal which has been melted and solidified (even though it was melted by heating). This greatly facilitates the recovery of lithium cobalt oxide and enhances the purity of the recovered product.

In the heating process (S3), the processing chamber is maintained as an atmosphere of inert gases as the batteries are heated. This prevents any reactive lithium from reacting with oxygen, and it prevents gases produced from the constituent materials of the battery from igniting. It also prevents noxious gases from being generated by a reaction of the. electrolyte with the atmosphere. This process (S3) is applicable for both undischarged and fully discharged batteries.

Figure 10:
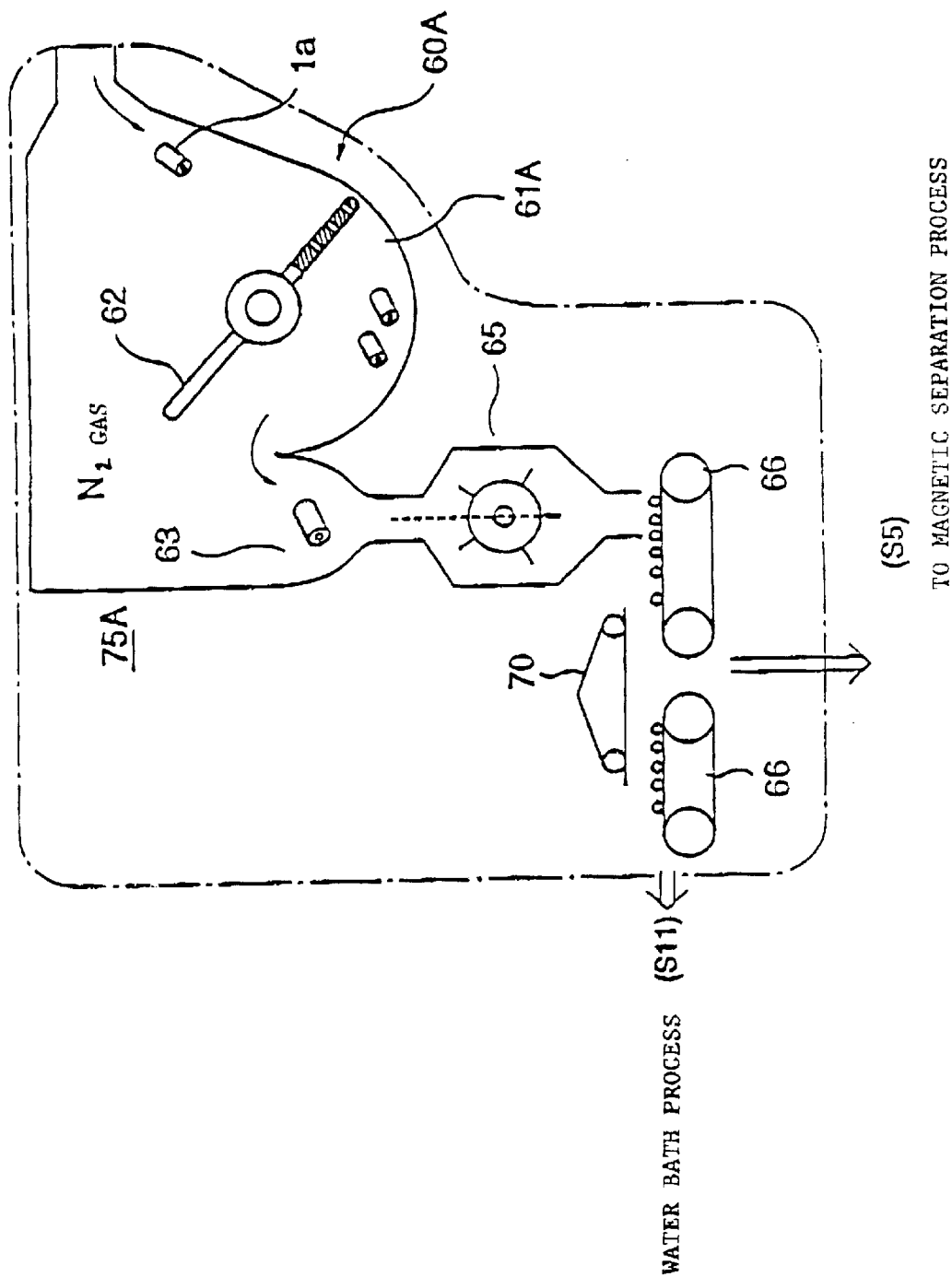
FIG. 10 is a rough sketch of a device to crush sealed battery cells after they are heated in Process 3 in FIG. 1.

FIG. 10 is a rough sketch of a device which might be used to crush sealed battery cells in process S4.

In FIG. 10, crusher 60A is placed in an atmosphere of nitrogen gas. Sealed battery cells 1a are pushed through outlet 63 into cutter mill 65 by rotary blade 62 and transported to magnetic separator 70 by conveyor belt 66. Here they are sorted into magnetic components, namely the cell cases, and non-magnetic components, namely the other constituents of the batteries. As an alternative to the cutter mill 65, sealed battery cells 1a may also be crushed in a roller or hammer mill.

If the temperature in the heating process (S3) does not exceed 660° C., the melting point of aluminum, the aluminum foil on the positive electrode and the copper foil on the negative electrode in battery cell 1a will still be intact when the batteries are crushed. Since each is about 5 cm×50 cm×0.02 cm, they can be reduced by crushing to fragments several centimeters on a side.

In the magnetic separation process (S5) executed by separator 70, the fragments are separated into the ferrous portions of the cases which enclosed the sealed battery cells and whatever is left behind.

The cases of the sealed cells separated in the process (S5) (i.e., the magnetic component) are submerged in a water bath in process S11, and only iron 3 is separated and recovered.

The water bath is used because the lithium hexafluorophosphate of the electrolyte which remains stuck to the iron fragments when the batteries are crushed and the ethylene carbonate and dimethyl carbonate used as solvents are water soluble. In the water bath process (S11) they are dissolved in an aqueous solution. The lithium cobalt oxide coated with polyviridene chloride which has been removed from the aluminum foil of the positive electrode and is stuck to iron fragments consists of particles only about 5 μm in diameter. Because it is not water soluble and its specific gravity is 5, we can cause it to disperse through the water in process S11 and thus separate iron 3. The acetylene black stripped off the aluminum foil of the positive electrode and the graphite (spheroidal graphite) from the negative electrode can also be dispersed through the water in the water bath process (S11).

The non-magnetic fragments remaining after the magnetic separation process (S5) are subjected for fifteen minutes to ball vibration provided by the ball vibration device (S6). They are then passed through a sieve with a 0.3 mm mesh (S7).

To reiterate, because the crushing process (S4) is executed after the process (S3) of heating the batteries in an atmosphere of inert gases, the lithium cobalt oxide 7 can be peeled off the aluminum foil of the positive electrode and the graphite (spheroidal graphite) from the copper foil of the negative electrode. The ethylene carbonate, dimethyl carbonate, poliviredene chloride and lithium hexafluorophosphate used as the electrolyte were all released in the heating process (S3) executed earlier. The polyviridene or polyethylene used in the separator were broken down in the heating process (S3) of the prior stage. The gases generated in the heating process (S3) are processed along with gases generated in other operations in the combustion process (S8) or processed as exhaust gas without further treatment (S9).

To be more specific, in the heating process (S3) the batteries are heated to between 200 and 1500° C., ideally between 500 and 1300° C., in an atmosphere of inert gases. The polyviridene chloride, which is caked with the acetylene black and lithium cobalt oxide from the positive electrode, is pyrolyzed. The pyrolysis causes the adhesive force of the acetylene black and lithium cobalt oxide on the aluminum foil to diminish. After the subsequent crushing, magnetic separation and eddy current processes (S4, S5 and S5'), the fragments are subjected to more crushing and vibration using a ball mill (S6). In this way the acetylene black and lithium cobalt oxide 7 can be separated from the aluminum foil.

Similarly, when the batteries are heated in an atmosphere of inert gases in heating process S3, the polyviridene chloride on the negative electrode is pyrolyzed. This causes its adhesive force on the graphite coated onto the copper to diminish. After the subsequent crushing, magnetic separation and eddy current processes (S4, S5 and S5'), the fragments are subjected to ball vibration (S6). In this way the graphite can be separated from the copper foil.

Just as in the ball vibration device (S6) pictured in FIG. 9, the fragments remaining after the batteries have passed through the heating process (S3), the crushing process (S4) and the magnetic separation and eddy current processes (S5 and S5') are interspersed with balls, and vibration generator 44 is actuated. Chamber 45, which is supported by spring 44a, is vibrated, and the acetylene black, lithium cobalt oxide and graphite are peeled of f the aluminum and copper foil.

The present inventors experimented with ball mill vibration as well, placing the non-magnetic fragments in a rotating cylinder along with a number of balls and subjecting the cylinder to vibration as it rotated in order to peel the materials off the aluminum and copper foil. However, we obtained a more satisfactory result with a ball vibration device (S6) to which vibration was imparted directly by vibration generator 44.

To prepare for ball mill vibration, the fragments remaining after the magnetic separation process and the eddy current process which will be discussed shortly (S5 and S5') were heated to 300° C. for six minutes and 400° C. for five minutes. They received ball mill vibration (in a rotating cylinder) for 30 minutes using zirconia balls 5 mm in diameter. They were then passed through a sieve with a mesh of 0.3 mm. 53% of the original weight of material was recovered in fragments less than 0.3 mm in diameter. The recovered lithium cobalt oxide had a purity of 98%. The aluminum foil recovered from the sieve had a composition of 63% cobalt and 9% aluminum. This convinced us that the lithium cobalt oxide had not been sufficiently peeled off the aluminum foil.

For the ball vibration device, the fragments were separated in two processes, a magnetic separation process and an eddy current process, which will be discussed shortly (S5 and S5'). They were then heated to 300° C. for ten minutes and subjected to ball vibration for 20 minutes using zirconia balls 5 mm in diameter and 10 minutes using zirconia balls 19 mm in diameter. They were passed through a sieve with a mesh of 0.3 mm. 43% of the original weight of material was recovered in fragments less than 0.3 mm in diameter. The recovered lithium cobalt oxide had a purity of 95%. The aluminum foil recovered from the sieve had a composition of 93% aluminum. We therefore concluded that the lithium cobalt oxide had been sufficiently peeled off the aluminum foil.

By using a sieving process (S7) after the ball vibration process (S6), we can separate the small particles of lithium cobalt oxide 7, acetylene black and graphite from the copper and aluminum foil.

The fragments of aluminum and copper foil crushed in the crushing process (S4) are several centimeters on a side, while the particles of acetylene black, graphite and lithium cobalt oxide are less than 1 mm in diameter. Thus placing all the materials in a sieve with openings of 0.3 to 3 mm in diameter will result in the aluminum and copper foil fragments remaining in the sieve while the lithium cobalt oxide, acetylene black and graphite fall through.

Because it is possible that substances other than aluminum and copper foil (which will be discussed shortly) will be stuck to the foil and caught in the sieve, we subject the contents of the sieve to a water bath (S12).

When the copper and aluminum foil left in the sieve are subjected to a water bath (S12), the lithium hexafluorophosphate of the electrolyte, the polyviridene chloride, and the ethylene carbonate and dimethyl carbonate used as solvents all dissolve and go into aqueous solution. The lithium cobalt oxide 7 and the acetylene black with which it is coated both comprise extremely small particles. Because they are not water soluble, when immersed in the water bath (S12) they will disperse through the water. In this way the a copper and aluminum foil 4 can be separated and recovered. Lithium cobalt oxide and carbon 6 will be found under the sieve.

The lithium cobalt oxide and the carbon, including acetylene black and graphite, which were separated when they passed through the sieve in S7, along with the polyviridene chloride which is stuck to them, the lithium hexafluorophosphate, and the ethylene carbonate and dimethyl carbonate used as solvents, undergo size enlargement as needed (S13). They pass through a chilling and crushing process (S4A), a magnetic separation process (S5) and a heating process (S3). They are combusted (S8) using a fuel 8 along with ethylene carbonate and dimethyl carbonate, the solvents generated at various points in these processes. In the combustion process (S8), the carbon component is incinerated and the lithium cobalt oxide 7 is recovered.

The lithium cobalt oxide, acetylene black and graphite which fall through the sieve in process S7 are subjected to size enlargement in process S13 along with the polyviridene chloride and lithium hexafluorophosphate which remain after the heating process (S3). This prevents the scattering that would occur if they were left in their powdery form and allows them to be combusted more efficiently in process S8.

When the size of these materials is enlarged (S13) using the water of the water bath (S11 and S12), the lithium cobalt oxide 7 recovered from the water bath after magnetic separation and the lithium hexafluorophosphate, polyviridene chloride, ethylene carbonate and dimethyl carbonate stuck to cell case 1a (the magnetic portion of the materials) are formed into a single chunk. This makes it possible to incinerate them in the combustion process (S8) which follows the size enlargement (S13).

In the combustion process (S8), the lithium cobalt oxide 7, the acetylene black and graphite, the lithium hexafluorophosphate, the polyviridene chloride coating, the portions of the solvents ethylene carbonate and dimethyl carbonate which did not vaporize in the heating process (S3), and the ethylene carbonate, dimethyl carbonate and polyviridene chloride produced in the chilling and crushing process (S4A), the subsequent magnetic selection process (S5) and the heating process (S3) are all incinerated, and the lithium cobalt oxide 7 is recovered.

This combustion process (S8) is used because it can take advantage of the fact that the lithium cobalt oxide 7 will not combust or transform and the fact that the phosphorus and fluorine which constitute the bulk of the lithium hexafluorophosphate will transition into their gaseous forms. This allows the lithium cobalt oxide 7 to be recovered in the combustion process (S8). The ethylene carbonate, dimethyl carbonate and polyviridene chloride produced in the chilling and crushing process (S4A), the subsequent magnetic selection process (S5) and the heating process (S3), and the polyviridene chloride, lithium hexafluorophosphate, ethylene carbonate and dimethyl carbonate which remain unpyrolized at the end of the heating process (S3) are all incinerated in the combustion process (S8).

The exhaust gas generated in the combustion process (S8) is treated (S9) in an absorption tower in which it is sprayed with a $Ca(OH)_2$ solution 5. In a wastewater treatment/solid separator tank (S10), the lithium hexafluorophosphate is separated from wastewater 11 and recovered as solid waste 10 ($CaF_2$ and $Ca_3(PO_4)_2$).

In the exhaust gas treatment process (S9), the fluoride compounds and phosphoric acid compounds produced from the lithium hexafluorophosphate are reacted with a $Ca(OH)_2$ solution 5 to produce $Ca_3F_2$ and $Ca_3(PO_4)_2$, which are insoluble in water. $Ca(OH)_2$ solution 5 is added to the wastewater treatment/solid separator tank (S10 ), and solid waste 10 ($CaF_2$ and $Ca_3(PO_4)_2$) is separated and recovered from wastewater 11.

The lithium fluoride generated by the reaction of lithium hexafluorophosphate in the heating and combustion processes (S3 and S8) is subjected to two water baths (S11 and S12) which cause it to separate into the water.

The aqueous solution resulting from processes S11 and S12 is also conveyed to the wastewater treatment/solid separator tank (S10), where the fluoride ions separated into the water are reacted with $Ca(OH)_2$ solution 5 to produce $CaF_2$, a compound which is not water-soluble. So by adding $Ca(OH)_2$ solution 5 to the wastewater treatment/solid separator tank, we can separate and recover solid waste 10 ($CaF_2$ and $Ca_3(PO_4)_2$) from wastewater 11.

After the gas has been removed in the heating process (S3) and the exhaust gas generated in the combustion process (S8) has been treated in two water baths (S11 and S12) and sprayed with $Ca(OH)_2$ solution 5 in an absorption tower (S9), the resulting lithium hexafluorophosphate solution is stable. By adding dilute hydrochloric acid 9 to the wastewater treatment/solid separator tank (S10), we maintain the acidity of the aqueous solution. This will accelerate the hydrolysis as per Formula 1.

$$LiPF_6 + 5H_2O \rightarrow LiOH + HF + PO(OH)_3 \qquad 1)$$

When we then add calcium hydroxide $Ca(OH)_2$, we generate stable ($CaF_2$ and $Ca_3(PO_4)_2$) as per Formulas 2 and 3 below.

$$Ca(OH)_2 + HF \rightarrow CaF_2 + 2H_2O \qquad 2)$$

$$3Ca(OH)_2 + 2PO(OH)_3 \rightarrow Ca_3(PO_4)_2 + 6H_2O \qquad 3)$$

As an alternative to dilute hydrochloric acid 9, we can accelerate the hydrolysis by adding a dilute solution of another strong acid such as sulfuric acid or nitric acid to the wastewater treatment/solid separator tank (S10). The dilute hydrochloric acid 9 should be heated to at least 65° C., ideally to between 90 and 100° C.

Figure 15:
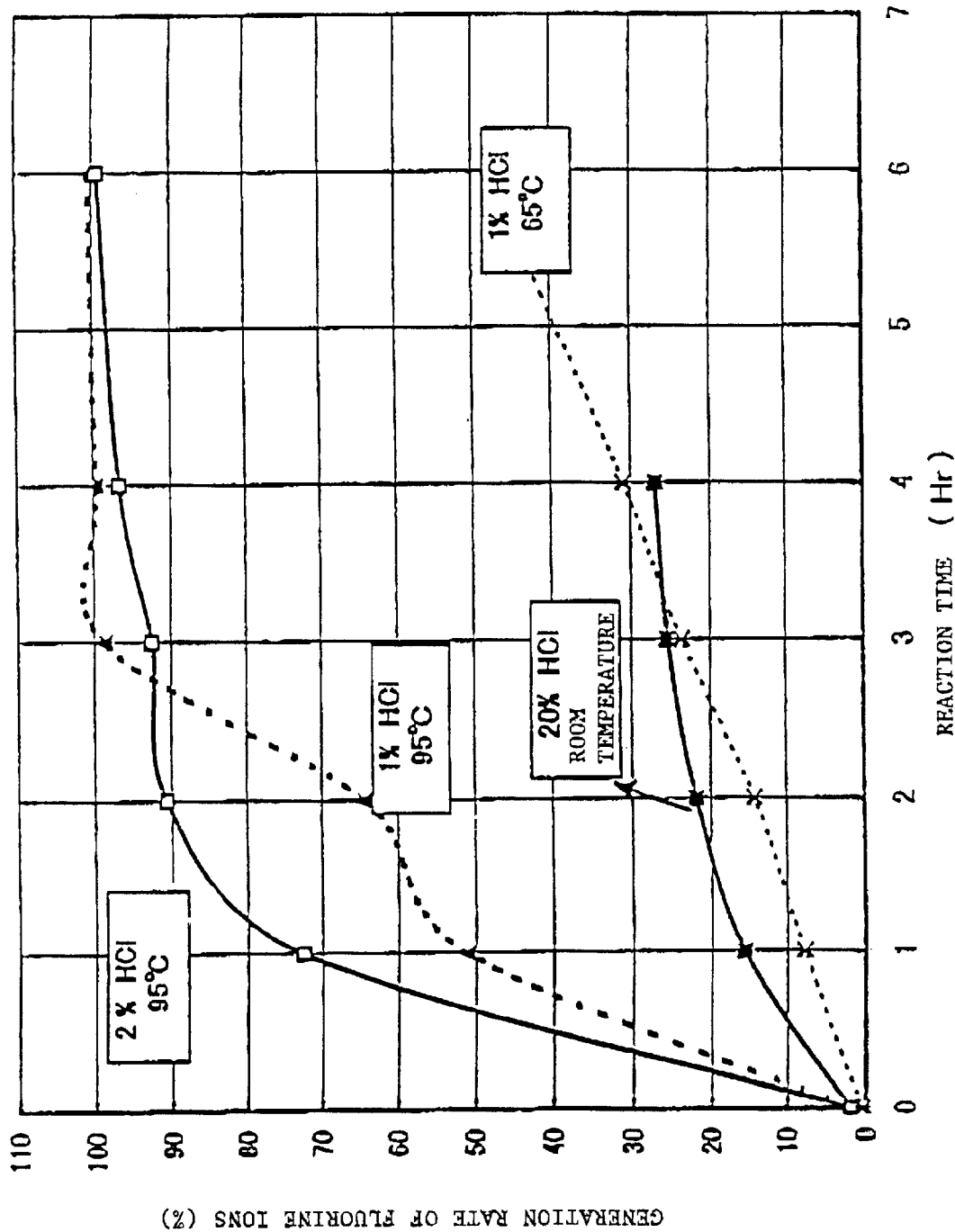
FIG. 15 is a graph of the rates of acidolysis by hydrochloric acid on lithium hexafluorophosphate which has been separated in an aqueous solution.

To be more specific, as can be seen in FIG. 15, when we accelerate the hydrolysis by using a strong acid solution with a high concentration of acid at normal temperature (a 20% HCl solution at ambient temperature), the hydrolysis never proceeds beyond 28%, and the bulk of the material never undergoes hydrolysis.

However, increasing the concentration of the acid would cause problems with respect to corrosion of the equipment and safety. Instead, we heated a dilute hydrochloric acid solution with a concentration of only 1% (a 1% HCl solution) to 65° C. This produced a hydrolysis rate of over 40%.

If we heated a dilute hydrochloric acid solution (a 1% HCl solution) to 95° C., we achieved a hydrolysis rate of 100%.

When we increased the concentration of the dilute hydrochloric acid solution to 2% at 95° C., we were able to reduce the reaction time of the hydrolysis.

To summarize, the results of the experiment showed that using a dilute hydrochloric solution with a concentration between 1 and 2% which is heated to between 65 and 100° C. (i.e., to a temperature below its boiling point) will substantially accelerate the hydrolysis.

Figure 16:
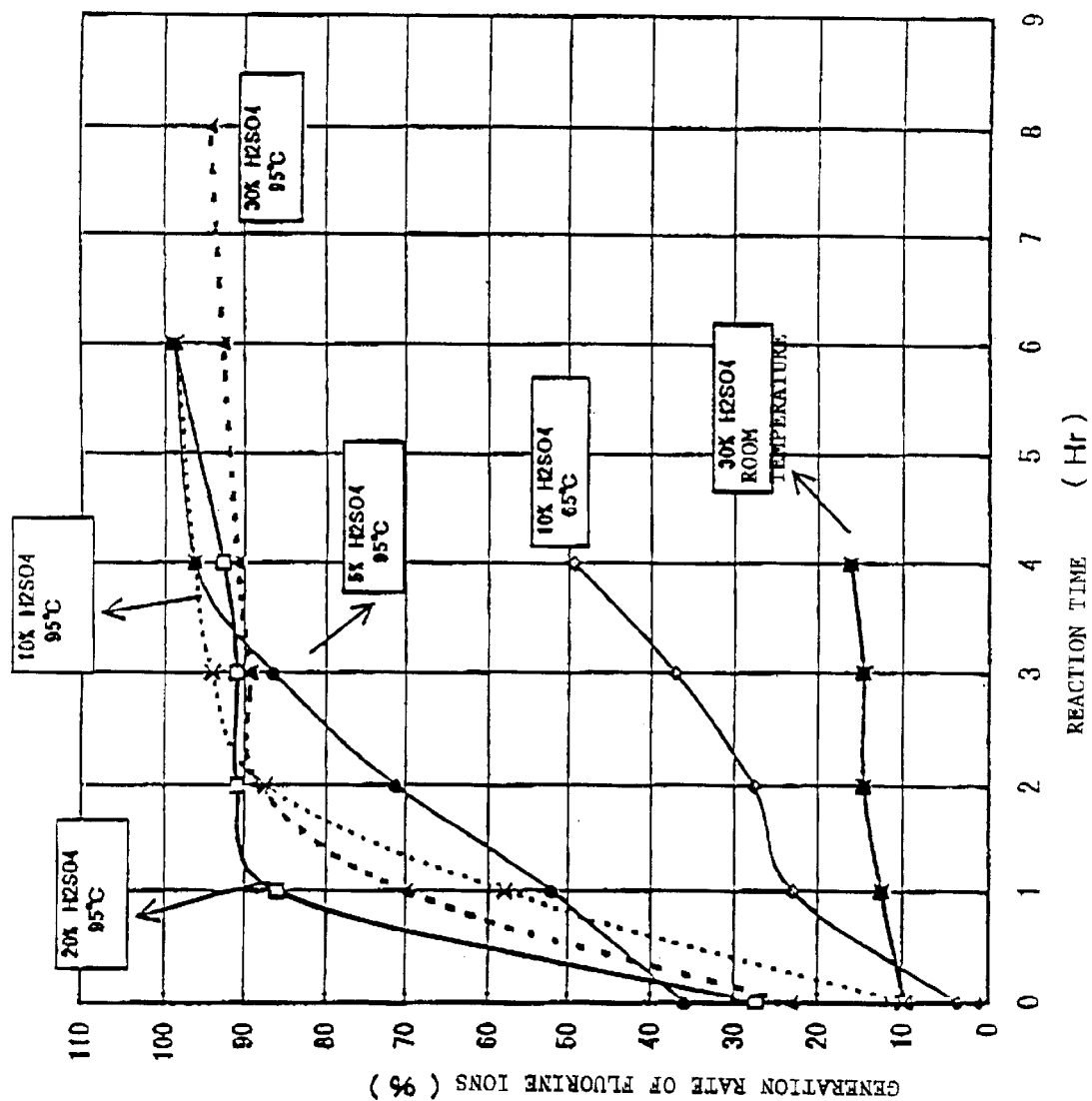
FIG. 16 is a graph of the rates of acidolysis by sulfuric acid on lithium hexafluorophosphate which has been separated in an aqueous solution.
Figure 17:
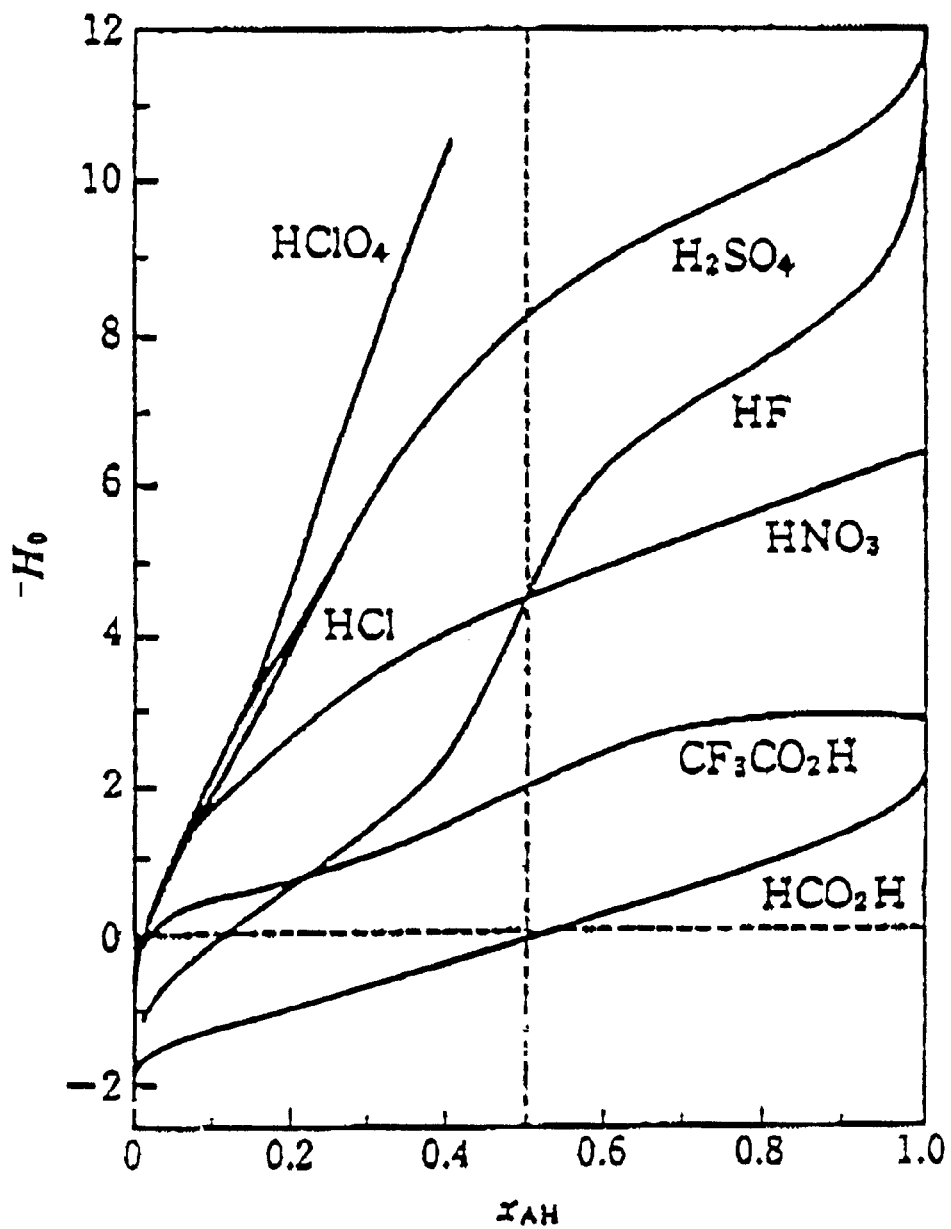
FIG. 17 is a graph of the relationship between the concentration of the acid solution and the ionic strength. (From *The Handbook of Chemistry, Fourth Revised Version of the Basic Edition, Part II:* Compiled by the Chemical Society of Japan, page 323.)

When we performed the same experiment using dilute sulfuric acid (a 30% $H_2SO_4$ solution at room temperature), as can be seen in FIG. 16, only 17% of the material was hydrolyzed with the remainder not affected.

When we used a 10% $H_2SO_4$ solution heated to 65° C., the hydrolysis rate climbed to more than 50%.

When we increased the concentration of the $H_2SO_4$ solution to 5%, 10%, 20% and 30% and heated it to 95° C., we were able to achieve a hydrolysis rate of 100% in each case.

With the $H_2SO_4$ solution heated to 95° C., the reaction time of the hydrolysis is reduced when the concentration is at least 10%, and this holds true for concentrations of 20% and 30% as well, with negligible difference in time.

From the results of these experiments, it is clear that either HCl or $H_2SO_4$ may be used in this invention, as both have ionic strength higher than the acid produced in the hydrolysis (in Formula 1, HF (hydrogen fluoride)). However, even when used at a lower concentration, HCl produces a 100% rate of hydrolysis.

By adding calcium hydroxide $Ca(OH)_2$ to the hydrolyzed solution, we can generate a stable product of ($CaF_2$ and $Ca_3(PO_4)_2$) as per the Formulas 2 and 3.

Thus with the current embodiment, the following effects are achieved.

(1) Used battery 1 is broken open in a chilling and crushing process (S1) and the sealed battery cell 1a inside it is removed from its plastic case 2. A magnetic sorter takes advantage of the fact that the battery case is made of a ferrous metal to remove sealed battery cell 1a from plastic case 2 in a magnetic sorting process (S2). As a result, plastic case 2 is removed from the system in its initial state.

(2) In processes S3 and S4, in which the battery is heated in an atmosphere of inert gases and crushed, respectively, the battery can be crushed without producing or vaporizing dangerous gases such as pentafluorophosphate and hydrogen fluoride.

(3) The magnetic sorting executed by the magnetic separator (S5) allows the iron component to be separated from all other materials.

(4) In the water bath process (S11), the lithium hexafluorophosphate of the electrolyte which adhered to the iron component when the battery was crushed and the ethylene carbonate and dimethyl carbonate used as solvents all dissolve. The lithium cobalt oxide 7 which was peeled off the aluminum foil of the positive electrode and got stuck to the iron component disperses through the water. Thus each of these materials can be separated from the iron 3.

(5) By combining the process S3 of heating the battery in an atmosphere of inert gases, the crushing process (S4), the magnetic separation process and the eddy current process (S5'), we can separate the aluminum foil from the lithium cobalt oxide 7 (including the acetylene black) with which the aluminum foil is coated. At the same time, we can separate the copper foil on the negative electrode from the graphite.

At this time, the ethylene carbonate or dimethyl carbonate used as the solvent, the polyviridene chloride, the lithium hexafluorophosphate and the polypropylene or polyethylene used in the separator are all removed from the system.

(6) In the sieving process (S7), the lithium cobalt oxide 7, the acetylene black and the graphite are separated from the aluminum and copper foil.

(7) When the matter which remains in the sieve at the end of process S7 is washed in a water bath (S12), the polyviridene chloride, the ethylene carbonate or dimethyl carbonate used as the solvent, the acetylene black and the lithium cobalt oxide 7 which became stuck to the aluminum and copper foil 4 in the heating process (S3) and the ball vibration process (S6) are separated, allowing the aluminum and copper foil 4 to be recovered efficiently.

(8) When the carbon 6, including the lithium cobalt oxide 7, the acetylene black and the graphite, undergoes size enlargement (S13) along with the polyviridene chloride and lithium hexafluorophosphate remaining at the end of the heating process (S3), the scattering that would have occurred if they were left in their powdery form is prevented, and they can be combusted more efficiently in the combustion process (S8).

Because the size of the particles is enlarged (S13) using water from the water bath (S12 and S11), the lithium cobalt oxide 7 recovered in the water bath after the magnetic separation and the lithium hexafluorophosphate, polyviridene chloride and ethylene carbonate or dimethyl carbonate which are stuck to the iron component can be burned more efficiently in the subsequent combustion process (S8).

(9) In the combustion process (S8), the lithium cobalt oxide 7 can be separated from the lithium hexafluorophosphate, graphite or other carbon and recovered.

(10) The ethylene carbonate, dimethyl carbonate and polyviridene chloride generated in the chilling and crushing process (S4A) and the subsequent magnetic separation (S5), eddy current (S5') and heating (S14) processes, and the polyviridene chloride, lithium hexafluorophosphate, ethylene carbonate and dimethyl carbonate remaining unsublimated and unpyrolized at the end of the heating process (S3) can be incinerated in the combustion process (S8).

(11) In the water baths (S12 and S11), the lithium cobalt oxide 7 can be separated from the lithium fluoride which is a product of the reaction of the lithium hexafluorophosphate.

(12) The wastewater treatment whereby a $Ca(OH)_2$ solution 5 is added to the wastewater treatment/solid separator tank (S10) causes the fluorine ions generated from the lithium fluoride to separate from the wastewater 11 and be recovered as solid waste 10 ($CaF_2$). If we use an acid solution heated to between 65 and 100° C., the hydrolysis is substantially accelerated. If we add $Ca(OH)_2$ (calcium hydroxide) to the aqueous solution after the hydrolysis, we can produce a stable product of ($Ca_3F_2$ and $Ca_3(PO_4)_2$).

(13) The wastewater treatment whereby a $Ca(OH)_2$ solution 5 is added to the wastewater treatment/solid separator tank (S10) causes the fluoride compounds and phosphoric acid compounds produced from the lithium hexafluorophosphate in the exhaust gas treatment process (S9) to be separated from the wastewater 11 as solid waste 10 ($Ca_3F_2$ and $Ca_3(PO_4)_2$) so that they can be recovered.

A process in which ultrasonic vibration is used to peel the coating off the foil may be used in place of the ball vibration device (S6) with the same effect.

Figure 2:
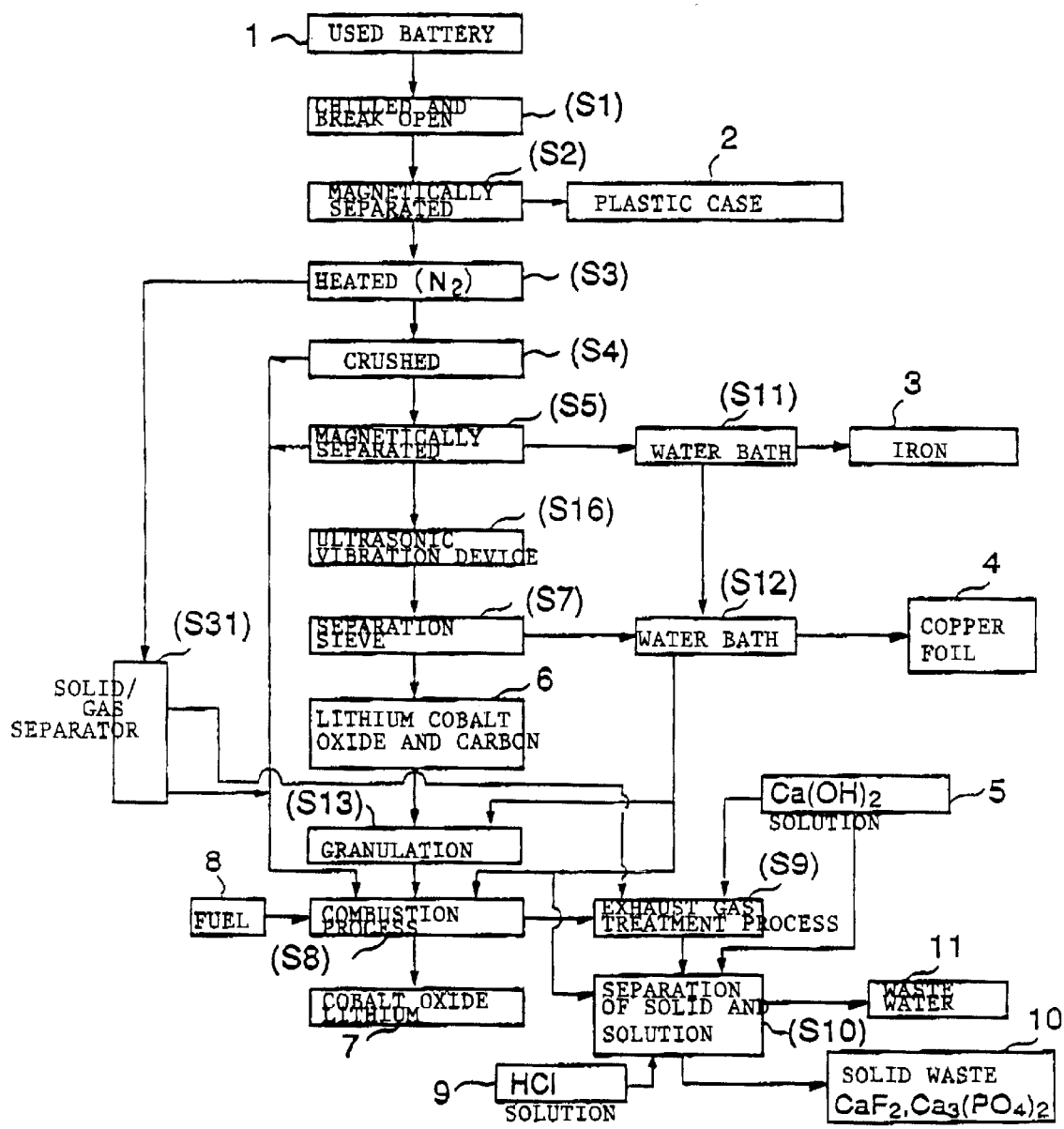
FIG. 2 is a flow chart of a process to dismantle lithium ion batteries which is related to the second preferred embodiment of this invention. Here, instead of using ball vibration to peel the metal foil from the electrodes as in FIG. 1, ultrasonic vibration is used.

FIG. 2 is a flow chart of a process to dismantle lithium ion batteries which is related to the second preferred embodiment of this invention. Here, instead of using ball vibration (S16) to peel the metal foil from the electrodes as in FIG. 1, ultrasonic vibration is used.

Figure 3:
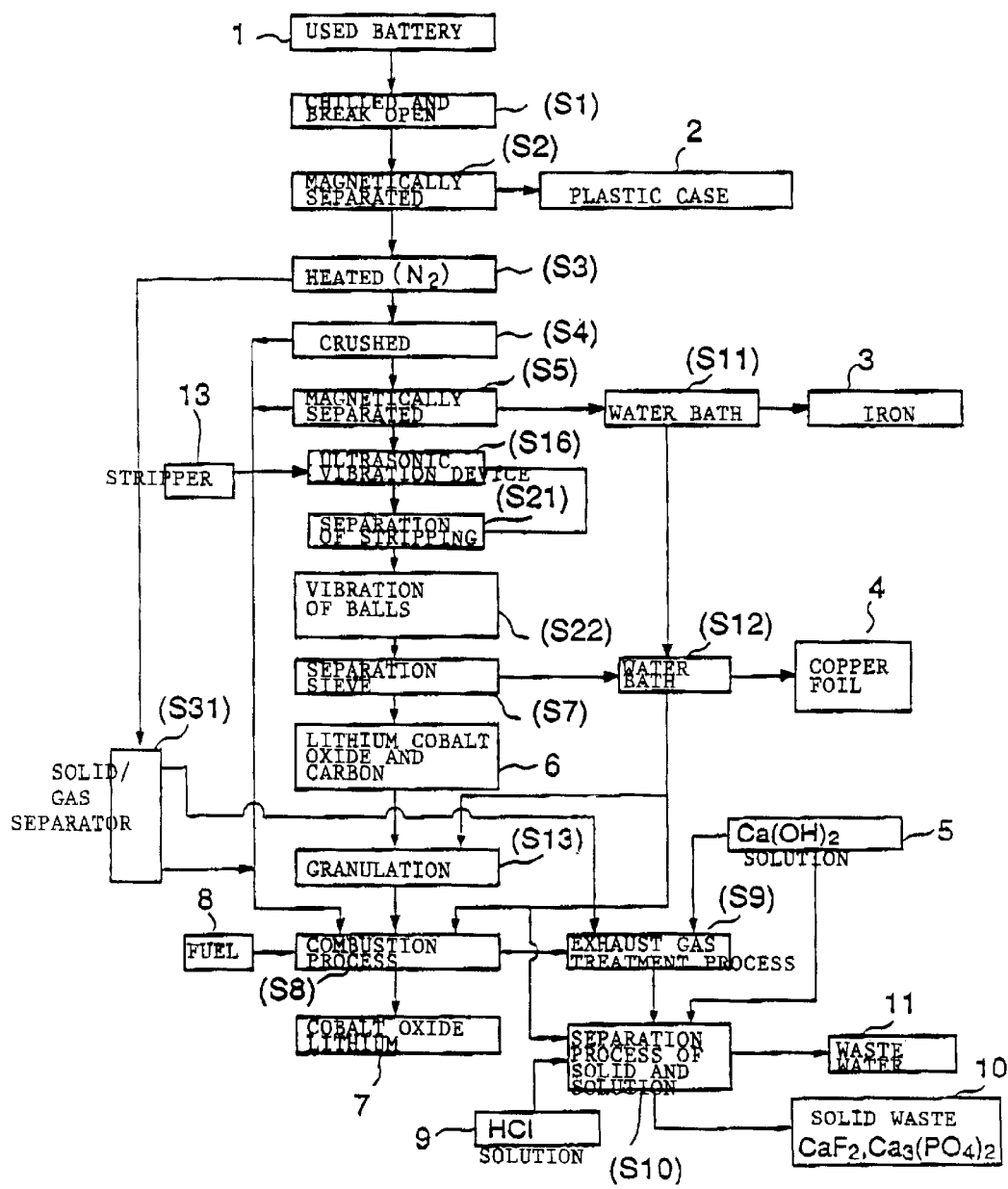
FIG. 3 is a flow chart of a process to dismantle lithium ion batteries which is related to the third preferred embodiment of this invention. Here a stripper is combined with ultrasonic vibration to strip the metal foil from the electrodes.

FIG. 3 is a flow chart of a process to dismantle lithium ion batteries which is related to the third preferred embodiment of this invention. Here a stripper is combined with ultrasonic vibration to strip the metal foil from the electrodes.

In this embodiment, the material remaining after the magnetic separation process (S5) is subjected to ultrasonic vibration (S16) while submerged in stripper 13, but without the addition of heat. The lithium cobalt oxide is thus separated from the aluminum foil. The stripper 13 separates the lithium cobalt oxide by means of gravity, centrifugal force or some other force (S21). The separator device may specifically comprise a filter and a centrifugal force separation device.

In order to separate the ethylene carbonate or dimethyl carbonate used as a solvent and the lithium hexafluorophosphate into a solution, the stripper 13 separated in the stripper separation process (S21) is repeatedly subjected to an ultrasonic vibration stripping process (S16). It is subjected to a water bath process (S12) and sent to wastewater treatment/solid-liquid separation process S10.

The lithium cobalt oxide from which the stripper 13 has been separated is crushed in a ball vibration or ball milling process (S22).

To give a more precise description of the process, Synthol YS (product name), a weak cationic compound made by the Nisshin Chemical Laboratory Corp. (N,N-dipolyoxyethylene-N-alkylamine, phosphoric acid) is used as stripper 13. The material remaining at the end of the magnetic separation process (S5) is submerged in a 1% solution of the stripper and subjected to ultrasonic vibration for eight minutes (S16). This results in the entire lithium cobalt oxide sheet peeling off the aluminum foil with no damage. At the same time, the solvent ethylene carbonate or dimethyl carbonate which remains at the end of the heating process (S3) and the lithium hexafluorophosphate are dissolved in the aqueous solution.

The stripper 13 is then separated by a separation means (S21) such as a filter, gravity or centrifugal force. The lithium cobalt oxide sheet is crushed by ball vibration or ball milling (S22). This crushed material is then passed through a sieve with 0.3 mm openings (S7) to separate it into lithium cobalt oxide and carbon 6.

With this embodiment, there is no need to heat the material sorted by the magnetic separation process (S5), so the procedure is safer and cheaper than other methods.

Also, with this embodiment stripper 13 successfully removes the lithium hexafluorophosphate from the aluminum foil of the positive electrode.

At the same time, the solvent ethylene carbonate or dimethyl carbonate and the lithium hexafluorophosphate are separated in solution.

The soaking liquid which contains the ethylene carbonate, dimethyl carbonate and lithium hexafluorophosphate separated in the stripping process (S21) is sent to the water bath process (S12) Where its harmful properties are removed.

Figure 4:
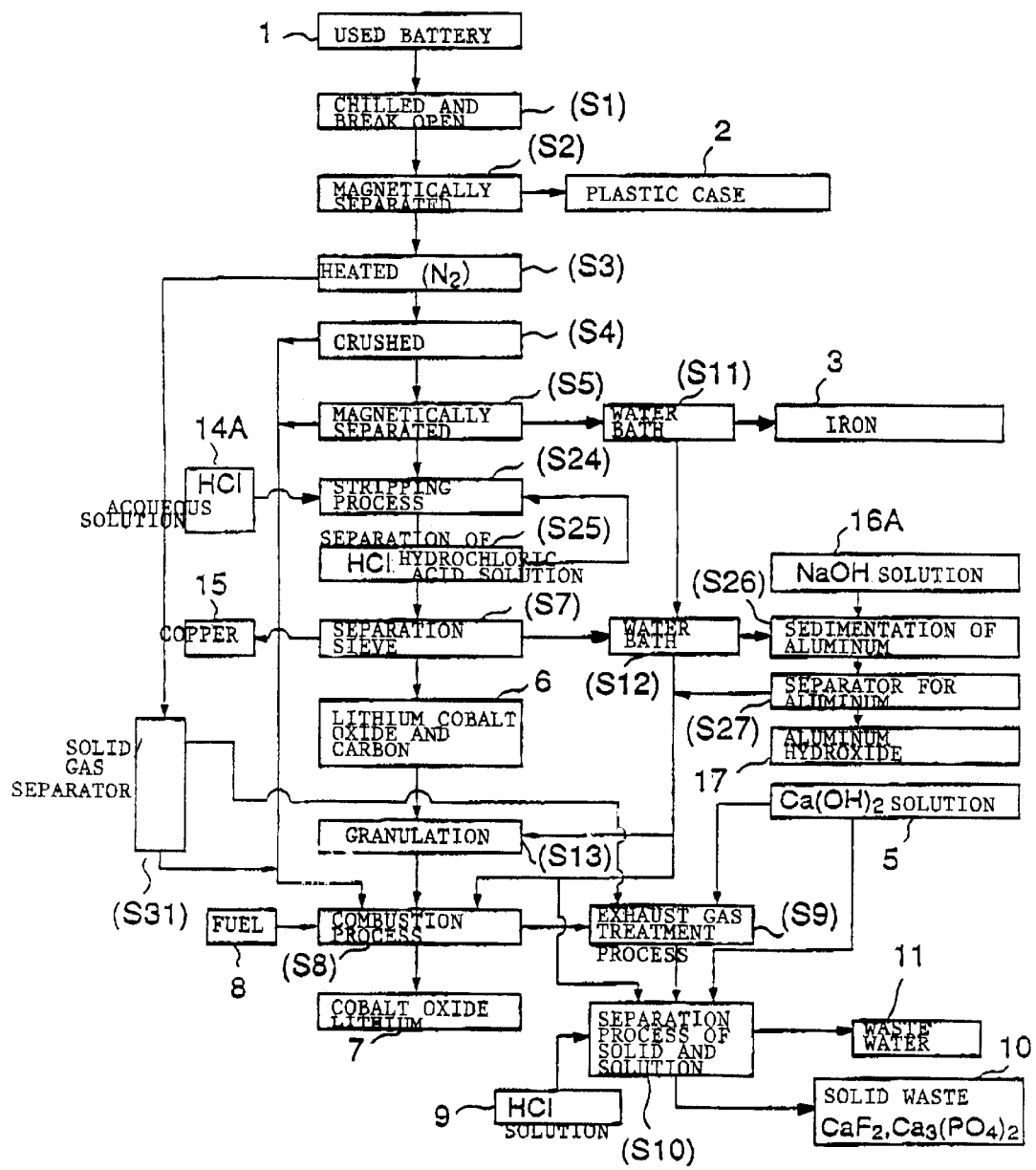
FIG. 4 is a flow chart of a process to dismantle lithium ion batteries which is related to the fourth preferred embodiment of this invention. Here an HCl solution is used to peel off (i.e., dissolve) the metal foil.

FIG. 4 is a flow chart of a process to dismantle lithium ion batteries which is related to the fourth preferred embodiment of this invention. Here a solution of HCl, a strong acid, is used as aqueous solution 14A to peel off (i.e., dissolve) the metal foil.

In this embodiment, just as in the third one, the lithium cobalt oxide is removed in a sheet from the aluminum foil using ultrasonic vibration (S16) and a stripper 13. Then, instead of being crushed by a ball vibration or ball milling vibration process (S22), the aluminum foil is dissolved directly by a dilute hydrochloric acid 14A to obtain the lithium cobalt oxide.

In this case, as can be seen in FIG. 13, if the dilute hydrochloric acid 14A is at room temperature, the aluminum will not dissolve unless the concentration of the solution is at least 5%.

With an HCl solution 14A of at least 5%, safety becomes an issue; also, the rate at which the lithium cobalt oxide dissolves in the HCl solution 14A increases, which is not desirable.

If dilute hydrochloric acid 14A is heated to 95° C., as can be seen in the chart in FIG. 14, the aluminum foil will dissolve even if the concentration of hydrochloric acid 14A is below 1% so that its pH is 0.87.

With a hydrochloric acid 14A of pH 0.87, safety becomes less of an issue, and the rate at which the lithium cobalt oxide dissolves in the HCl solution 14A decreases, which is the preferable outcome.

In this embodiment, then, the fact that aluminum and copper foil can be dissolved in a dilute hydrochloric acid solution is used to remove the lithium cobalt oxide 7 from the aluminum foil of the positive electrode and the graphite from the copper foil of the negative electrode (S24). To achieve the stripping effect, an agitator is used to forcefully mix the solution.

At the same time, the solvents ethylene carbonate and dimethyl carbonate and the lithium hexafluorophosphate are separated in the dilute hydrochloric acid solution 14A.

A solid-liquid separator separates the hydrochloric acid solution (S25), and the stripping process is repeated (S24). The solid-liquid separator may be a filter, a centrifugal force separator, or a sedimentation separator.

The non-magnetic materials separated (S25) by filter from HCl solution 14A are then passed through a 0.3 mm sieve.

The aluminum and copper dissolved in dilute hydrochloric acid solution 14A will precipitate at a pH of 2 to 4 and 6 to 8, respectively, producing aluminum hydroxide 17 and copper hydroxide. Taking advantage of these facts, a sodium hydroxide solution 16A is added to the aluminum precipitation tank (S26). An aluminum separator is then used (S27) to separate the aluminum and the copper.

With this embodiment, the lithium cobalt oxide is stripped from the aluminum foil of the positive electrode and the graphite from the copper foil of the negative electrode by adding a hydrochloride solution.

Figure 5:
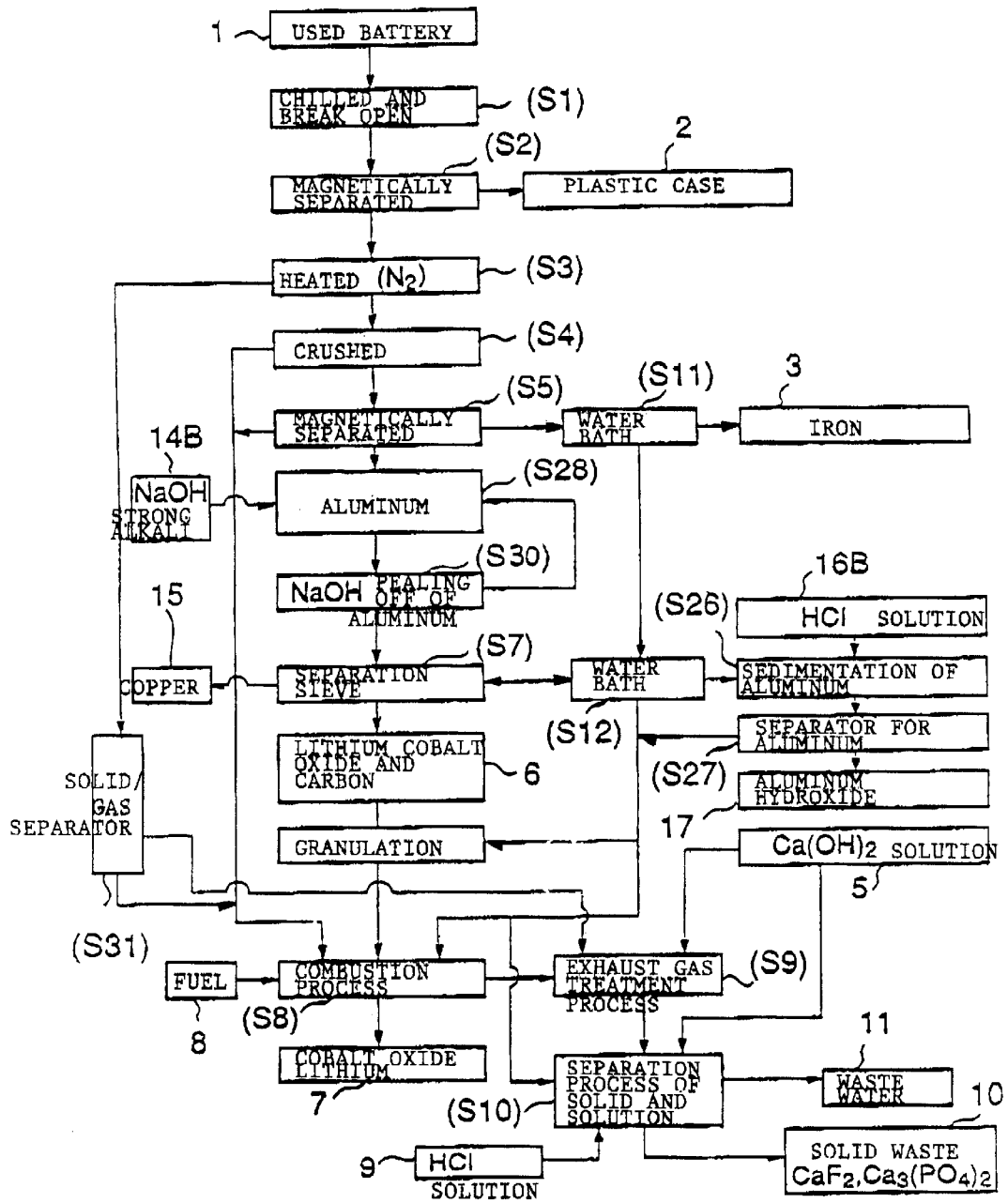
FIG. 5 is a flow chart of a process to dismantle lithium ion batteries which is related to the fifth preferred embodiment of this invention. Here a solution of NaOH, a strong alkali, is used to peel off (i.e., dissolve) the metal foil.

FIG. 5 is a flow chart of a process to dismantle lithium ion batteries which is related to the fifth preferred embodiment of this invention. Here solution 14B of NaOH, a strong alkali, is used to peel off (i.e., dissolve) the metal foil. In this embodiment, NaOH solution 14B is used instead of the dilute hydrochloric acid used in the fourth embodiment.

In this embodiment, the fact that aluminum will dissolve in a sodium hydroxide solution 14B is used to peel the lithium cobalt oxide off the aluminum foil of the positive electrode (S28). At the same time, the solvents ethylene carbonate and dimethyl carbonate and the lithium hexafluorophosphate are separated into the solution. With this embodiment, when the material remained in the NaOH solution 14B for thirty minutes, the aluminum foil was completely dissolved.

The aluminum which is dissolved in the sodium hydroxide solution 14B is separated by taking advantage of the fact that aluminum hydroxide will precipitate at a pH of 2 to 4. Hydrochloric acid 16B is added to the aluminum precipitation tank (S26), and the aluminum is separated by a separator (S27).

If needed, the non-magnetic materials separated by the NaOH solution (S30) may be physically separated using ball vibration (S7) and broken into smaller pieces, after which they are passed through a 0.3 mm sieve. The copper foil 15 will remain in the sieve and the lithium cobalt oxide and carbon 6 will fall through.

The sodium hydroxide solution 14B separated by the means to separate the NaOH solution (S30) is again subjected to the stripping process (S28). The means to separate the NaOH solution (S30) may specifically comprise a filter, a centrifugal force separation device and a precipitation separator, as was discussed earlier.

With this embodiment, when sodium hydroxide solution 14B is added, the lithium cobalt oxide 7 is separated from the aluminum foil of the positive electrode.

At the same time, the solvents ethylene carbonate and dimethyl carbonate and the lithium hexafluorophosphate are separated into the solution.

As was discussed above, all of these embodiments allow used lithium ion batteries to be processed safely.

Figure 6:
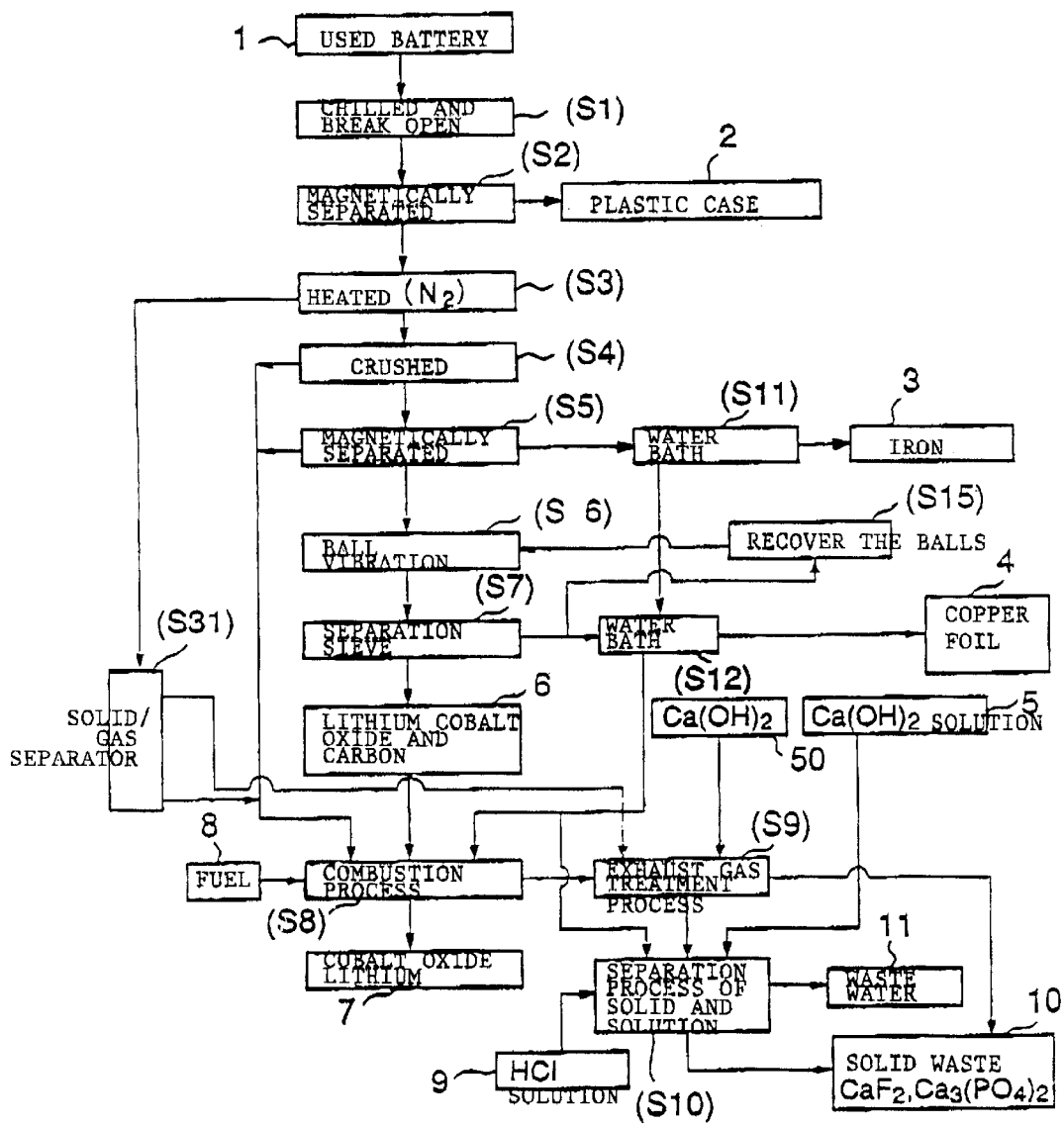
FIG. 6 is a flow chart of a process to dismantle lithium ion batteries which is related to the sixth preferred embodiment of this invention. Here the exhaust gas is managed via a dry process using a bag filter.

FIG. 6 is a flow chart of a process to dismantle lithium ion batteries which is related to the sixth preferred embodiment of this invention. Here the exhaust gas is managed via a dry process using a bag filter.

In the embodiments, the exhaust gas generated by heating the sealed battery cell in an atmosphere of inert gases and that generated in the combustion process (S8) is treated in a process (S9) comprising an absorption tower which sprays a Ca(OH)$_2$ solution. This sort of wet process requires sizeable equipment, and the wastewater treatment is burdensome.

In this embodiment, then, the exhaust gas treatment (S9) is executed using a dry method such as a bag filter.

In this way the harmful gases generated from the lithium hexafluorophosphate, such as fluoride compounds and phosphoric acid compounds, are reacted inside a bag filter with entrained Ca(OH)$_2$50 (calcium hydroxide). Using the fact that this produces Ca$_3$F$_2$ and Ca$_3$(PO$_4$)$_2$, which are insoluble in water, we can obtain solid waste 10 (CaF$_2$ and Ca$_3$(P$_4$)$_2$).

Because the lithium hexafluorophosphate remaining at the end of the dry exhaust gas treatment process (S9) is stable, it can be transported to the wastewater treatment/solid separator tank (S10), where a dilute hydrochloric acid 9 can be added. If the solution is kept acidic, hydrolysis as per the Formula 1 can be accelerated. In this way, the fluoride compounds and phosphoric acid compounds generated from the lithium hexafluorophosphate can be separated from wastewater 11 as solid waste 10 (CaF$_2$ and Ca$_3$(PO$_4$)$_2$), as was described above.

Figure 7:
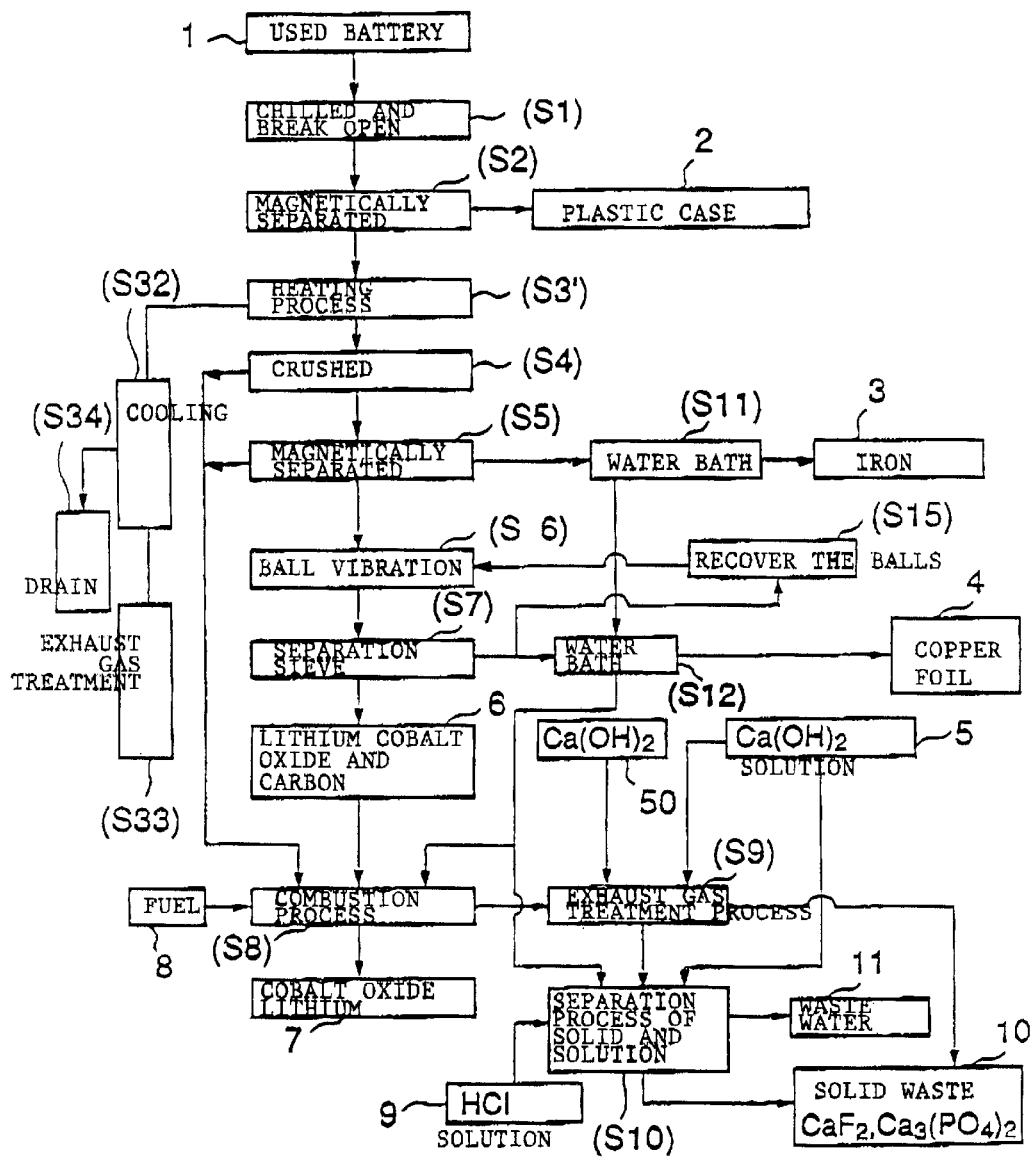
FIG. 7 is a flow chart of a process to dismantle lithium ion batteries which is related to the seventh preferred embodiment of this invention. Here, in contrast to the previously described embodiments, the heating process in S3 is carried out in a vacuum rather than in an atmosphere of inert gases. In addition, the exhaust gas is managed via a dry process using a bag filter.

FIG. 7 is a flow chart of a process to dismantle lithium ion batteries which is related to the seventh preferred embodiment of this invention. Here, in contrast to the previously described embodiments, the heating process in S3 is carried out in a vacuum (S3') rather than in an atmosphere of inert gases. In addition, the exhaust gas is treated (S9) with either a dry process using a bag filter or a wet process.

Here the heating process (S3) is carried out in a vacuum (S3') rather than in an atmosphere of inert gases for the following reason. If when the battery is heated in an atmosphere of inert gases the pressure inside the battery cell reaches the point where it exceeds the external pressure around it, the battery's safety valve operates, and the organic resins liquefied and the noxious gases sublimated by the heat are released to the exterior.

When such a safety valve is used, its operation must depend on the pressure differential of the valve. If the battery is heated in an atmosphere of inert gases, in which the exterior pressure is normal, the organic resins liquified and the noxious gases sublimated by the heat inside the battery cell will not be completely released to the exterior. (It would, of course, be possible to ameliorate the shortcoming by producing a negative pressure in the atmosphere of inert gases.)

With this embodiment, the pressure outside the battery cell is a vacuum, as is shown in S3'. The pressure needed to open the safety valve is lowered; in other words, the safety valve will open more readily. The organic resins liquified and the noxious gases sublimated by the heat are completely released to the exterior.

Because a vacuum is used here, there is no need to fill the chamber with inert gases; however, it would also be possible to use a small quantity of inert gases so as to create negative pressure in a near-vacuum.

When the battery is heated in the vacuum (S3'), the evaporation temperature of the organic resins will be lower. This reduces the danger and allows a more effective use of the heat energy.

The exhaust gas produced in the vacuum heating process (S3') is cooled (S32) to separate the organic resins into vapor and liquid or solid and vapor. The drain component (S34) of the liquid or solid organic resins which have been separated is removed. The remaining exhaust gas is sent to the exhaust gas treatment process (S33) where it undergoes the specified treatment. This exhaust gas treatment process (S33) may be identical to that in S9, or it may be a separate process.

Figure 11:
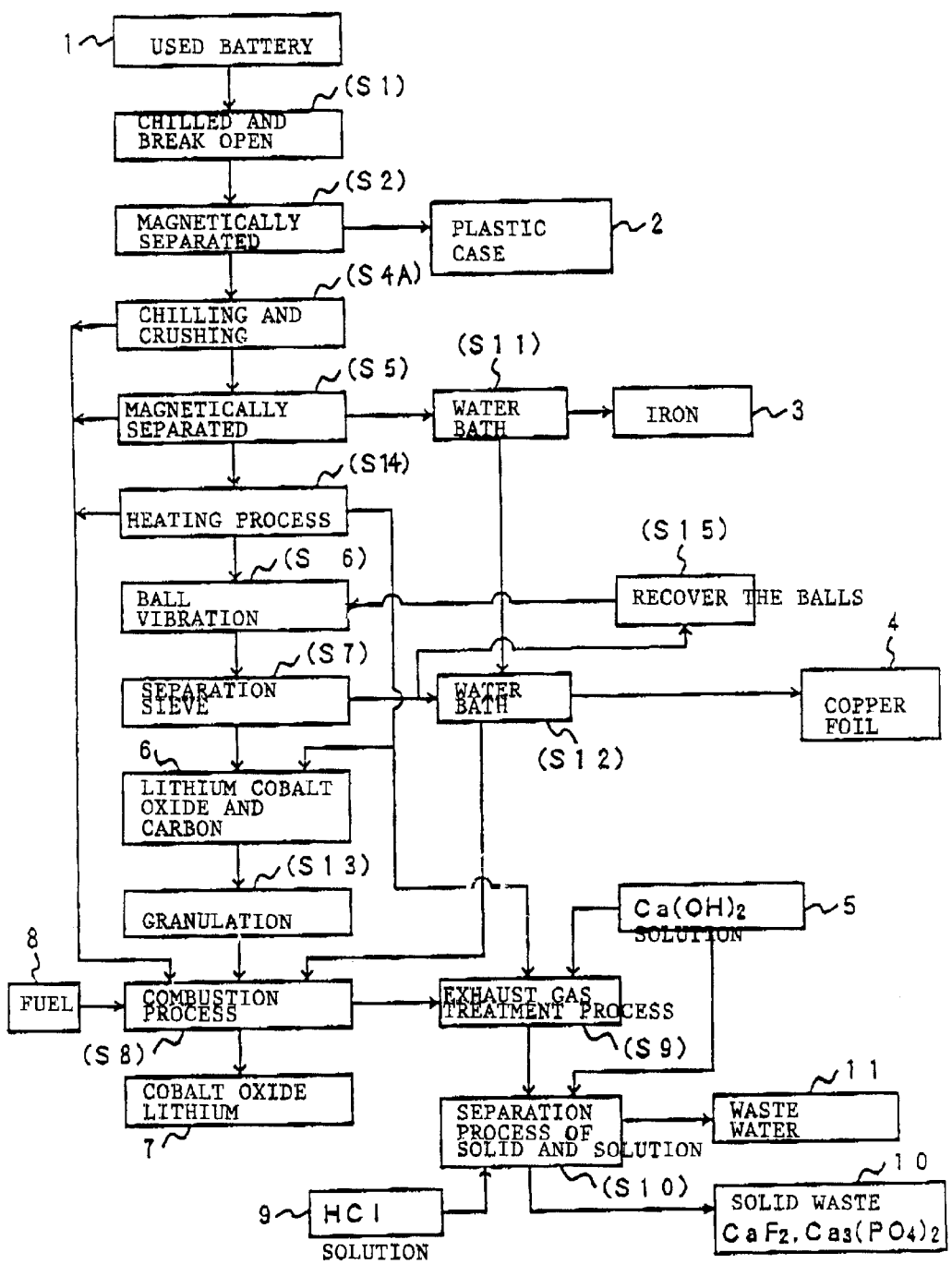
FIG. 11 is a flow chart of a process to dismantle lithium ion batteries which is related to the eighth preferred embodiment of this invention. Here, in contrast to the previously described embodiments, the battery cell is chilled before it is crushed.
Figure 12:
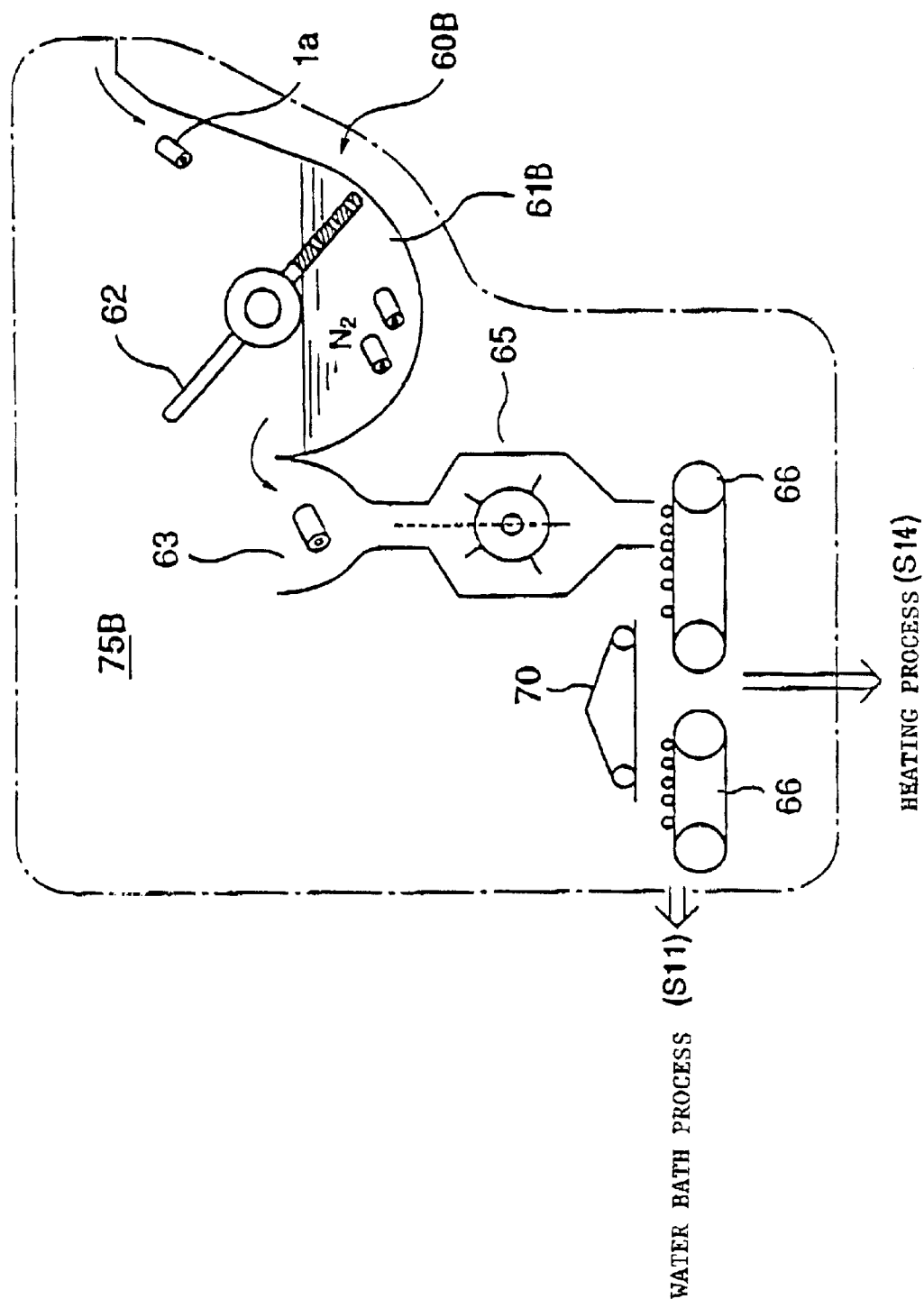
FIG. 12 is a rough sketch of a device to chill and crush sealed battery cells which would be used in Process 3 of FIG. 11.

FIG. 11 is a flow chart of a process to dismantle lithium ion batteries which is related to the eighth preferred embodiment of this invention. Here, in contrast to the previously described embodiments, the battery cell is chilled before it is crushed. FIG. 12 is a rough sketch of a device to chill and crush sealed battery cells which would be used in Process 3 of FIG. 11.

In this embodiment, the battery cell 1a which has been removed from the plastic case 2 is chilled and crushed in chilling and crushing process (S4A).

In FIG. 12, crushing device 60B is placed in an atmosphere of nitrogen gas. Battery cell 1a is immersed in liquid nitrogen 61B and chilled to below −50° C. Rotary blade 33 propels it through discharge port 63 into cutter mill 65. It is crushed while still at a temperature no greater than −50° C. Conveyor belt 66 carries the fragments to magnetic separator 70, where they are separated into their magnetic component, mainly the cell case, and the non-magnetic materials which constitute the battery.

The reason we chill the battery to −50° C. or lower is that this temperature range is below the melting point (−43° C.) of ethylene carbonate, which is a solvent at normal ambient temperature. This principle is the same one used in a previous embodiment. Battery cell 1a, now in a solid state, may also be crushed in an atmosphere whose temperature is kept below −50° C. by a roller or hammer mill in place of the cutter mill 65.

Since the aluminum foil of the positive electrode and the copper foil of the negative electrode in the battery are each about 5 cm×50 cm×0.02 cm, they can be reduced in the crushing process to fragments several centimeters on a side.

In this process (S4A), the atmospheric temperature is kept below the melting point of the solvent in the electrolyte solution (for example, around −50° C., hereafter referred to as the "interlocking temperature"). The chamber in which the process is executed is filled with inert gases or extremely dry air. This prevents combustible hydrogen gas from being generated in the reaction of the reactive lithium with the moisture component of the atmospheric air. It also prevents oxygen from being generated from the constituent materials of the battery; it prevents any generated gases from igniting; and it prevents noxious gases from being generated in the reaction of the electrolyte with the moisture component of the atmospheric air.

The material which remains after the magnetic material is removed in the magnetic selection process (S5) indicated by 70 in the drawing is heated to approximately 300° C. for ten minutes in the heating process (S14). It is then subjected to ultrasonic vibration for fifteen minutes using an ultrasonic vibration device (S16). Lastly it is passed through a sieve (S7) with openings 0.3 mm in diameter.

In the heating process (S14), the lithium cobalt oxide 7 is peeled off the aluminum foil of the positive electrode and the graphite (spheroidal graphite) is peeled off the copper foil of the negative electrode. At the same time, the solvents ethylene carbonate and dimethyl carbonate, the polyviridene chloride and the lithium hexafluorophosphate vaporize or decompose. The polypropylene or polyethylene used in the separator is pyrolyzed and combusted. The gases generated in the heating process (S14) are combusted along with gases generated in other procedures in combustion process S8, or they undergo exhaust gas treatment (S9) without any further processing.

To be more specific, when the non-magnetic materials are heated to between 300 and 500° C. in an atmosphere of inert gases, the polyviridene chloride which is stuck to the acetylene black and the lithium cobalt oxide comprising the positive electrode is pyrolized. The pyrolysis causes the adhesive force of the acetylene black and lithium cobalt oxide on the aluminum foil to diminish. In this state, the battery is then subjected to a ball vibration process (S6) and the ultrasonic vibration device (S16). In this way the acetylene black and lithium cobalt oxide 7 can be separated from the aluminum foil.

Similarly, when the polyviridene chloride on the negative electrode is pyrolyzed, the adhesive force between the graphite and the copper on which it is coated will also diminish. In this state, the battery is subjected to ball and ultrasonic vibration, and the graphite separates from the copper foil.

At this time, the solvents ethylene carbonate and dimethyl carbonate, the polyviridene chloride and the lithium hexafluorophosphate vaporize or pyrolize, and the polypropylene or polyethylene used in the separator are all In removed from the system by pyrolysis and combustion. Polyviridene chloride, lithium hexafluorophosphate, ethylene carbonate and dimethyl carbonate which remain unpyrolized at the end of the heating process are all incinerated in the combustion process. The remaining exhaust gas is sent to the exhaust gas treatment process (S9).

After the ball vibration process (S6), the material is passed through a sieve (S7) so that the small particles of lithium cobalt oxide 7, acetylene black and graphite are separated from the copper and aluminum foil, just as in the preceding embodiments.

Thus with this embodiment, using both a freezing and crushing process (S3A) and a heating process (S14) allows the valuable materials to be crushed and removed without producing dangerous gases such as pentafluorophosphate and hydrogen fluoride or having them explode.

Figure 18:
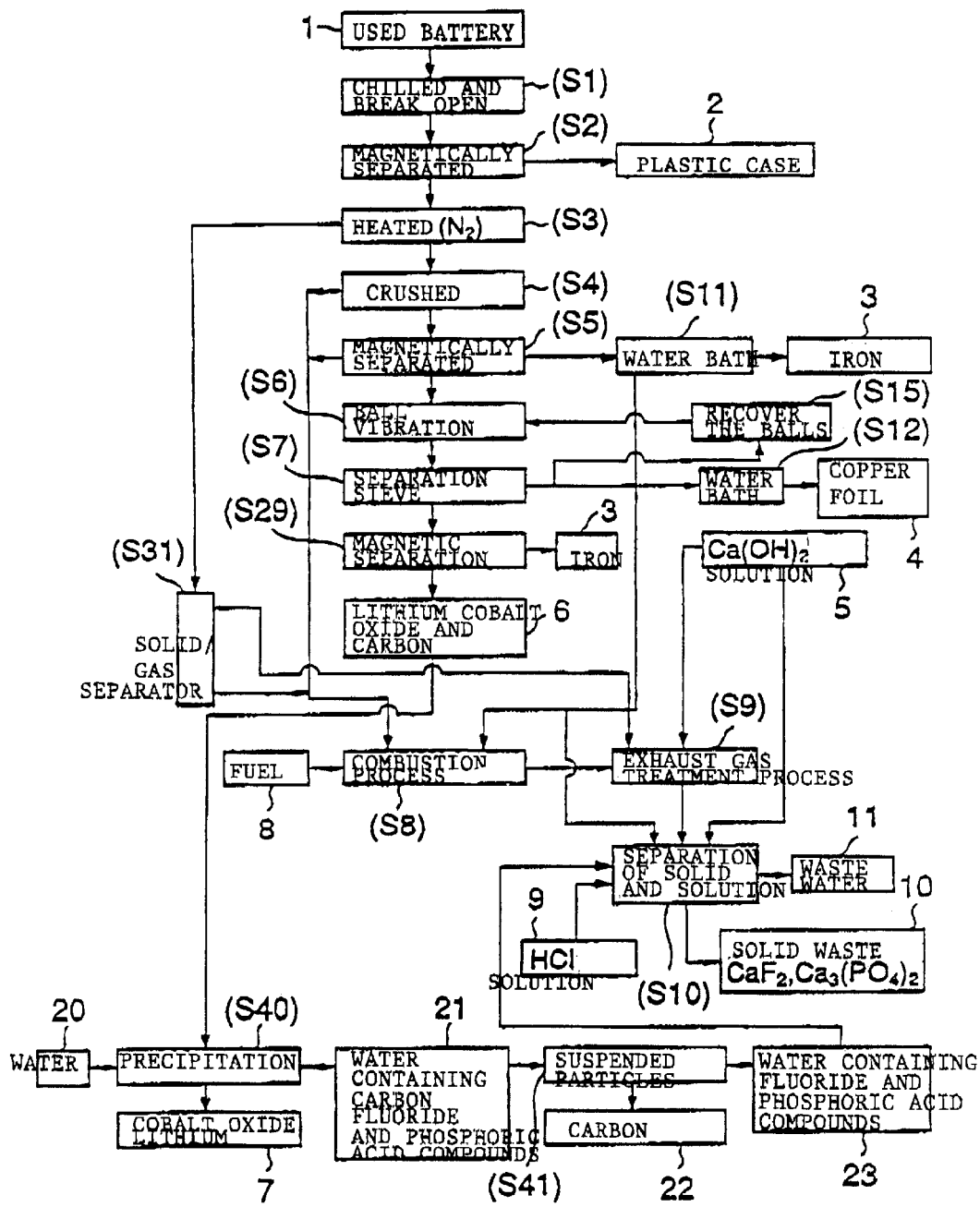
FIG. 18 is a flow chart of a process to dismantle lithium ion batteries which is related to the ninth preferred embodiment of this invention. Rather than enlarging the size of lithium cobalt oxide and carbon particles and combusting them, this process extracts these materials by sedimentation. This embodiment corresponds to that shown in FIG. 1.

FIG. 18 is a flow chart of a process to dismantle lithium ion batteries which is related to the ninth preferred embodiment of this invention. Rather than enlarging the size of lithium cobalt oxide and carbon particles and combusting them, this process extracts these materials by sedimentation. This embodiment corresponds to that shown in FIG. 1.

With this invention, the carbon component is not interspersed in the recovered lithium cobalt oxide, so a highly purified lithium cobalt oxide is recovered.

To focus on the aspects of this process which are different from the flow chart in FIG. 1, in this embodiment, a magnetic separation process (S29) is added to remove the interspersed iron component 24 from the recovered lithium cobalt oxide after it is sieved in S7.

The recovered products, namely lithium cobalt oxide and carbon, from which the interspersed carbon 3 was removed in the magnetic separation process (S29) are not sent to the combustion process (S8), but dispersed in water 20 in a precipitation process (S40). The water-soluble fluoride and phosphoric acid compounds are dissolved in the water, and the non-water-soluble lithium cobalt oxide 7 which precipitates is extracted. Since the specific gravity of lithium cobalt oxide is approximately 6 and that of carbon approximately 2, the differential is substantial enough to make them easy to separate by weight.

The water containing the remaining carbon and water-soluble fluoride and phosphoric acid compounds 21 is conducted to the device to separate suspended particles (S41), and the carbon 22 is removed.

The water 23 containing water-soluble fluoride and phosphoric acid compounds which is exhausted from the device to separate suspended particles (S41) is returned to the water bath process (S11).

With this embodiment, adding the magnetic separation process (S29) allows the iron 3 which would have contaminated the recovered product to be removed, resulting in the recovery of a highly purified lithium cobalt oxide.

There are some applications which are consistent with the fact that the recovered lithium cobalt oxide 7 contains iron. In such cases, the magnetic separation process (S29) can be omitted.

With the embodiment, not only the carbon 22, but also the fluoride and phosphoric acid compounds 23 are ionized compounds which dissolve in water. This makes them easy to remove.

Figure 19:
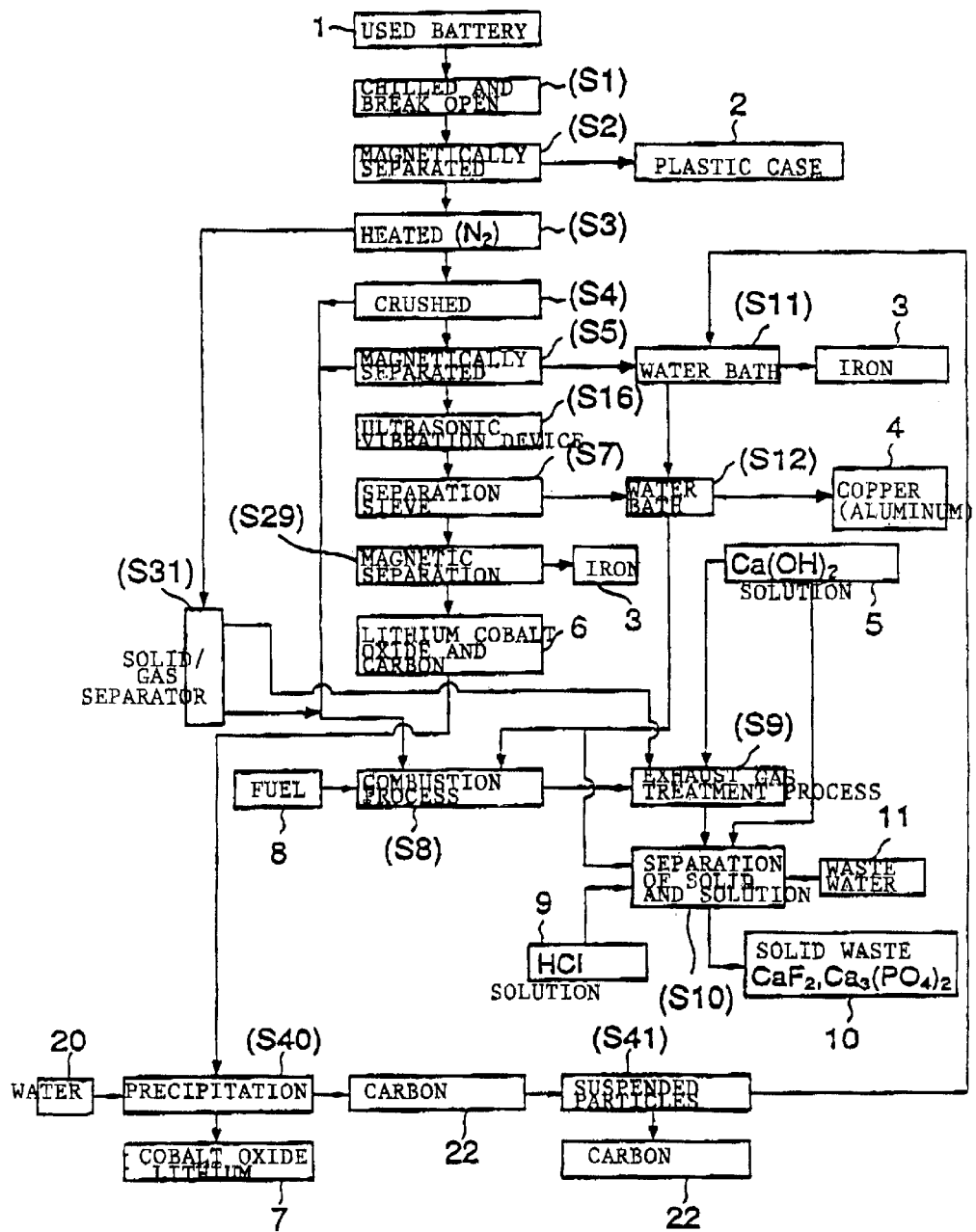
FIG. 19 is a flow chart of a process to dismantle lithium ion batteries which is related to the tenth preferred embodiment of this invention. Rather than enlarging the size of lithium cobalt oxide and carbon particles and combusting them, this process extracts these materials by sedimentation. This embodiment corresponds to that shown in FIG. 2.
Figure 20:
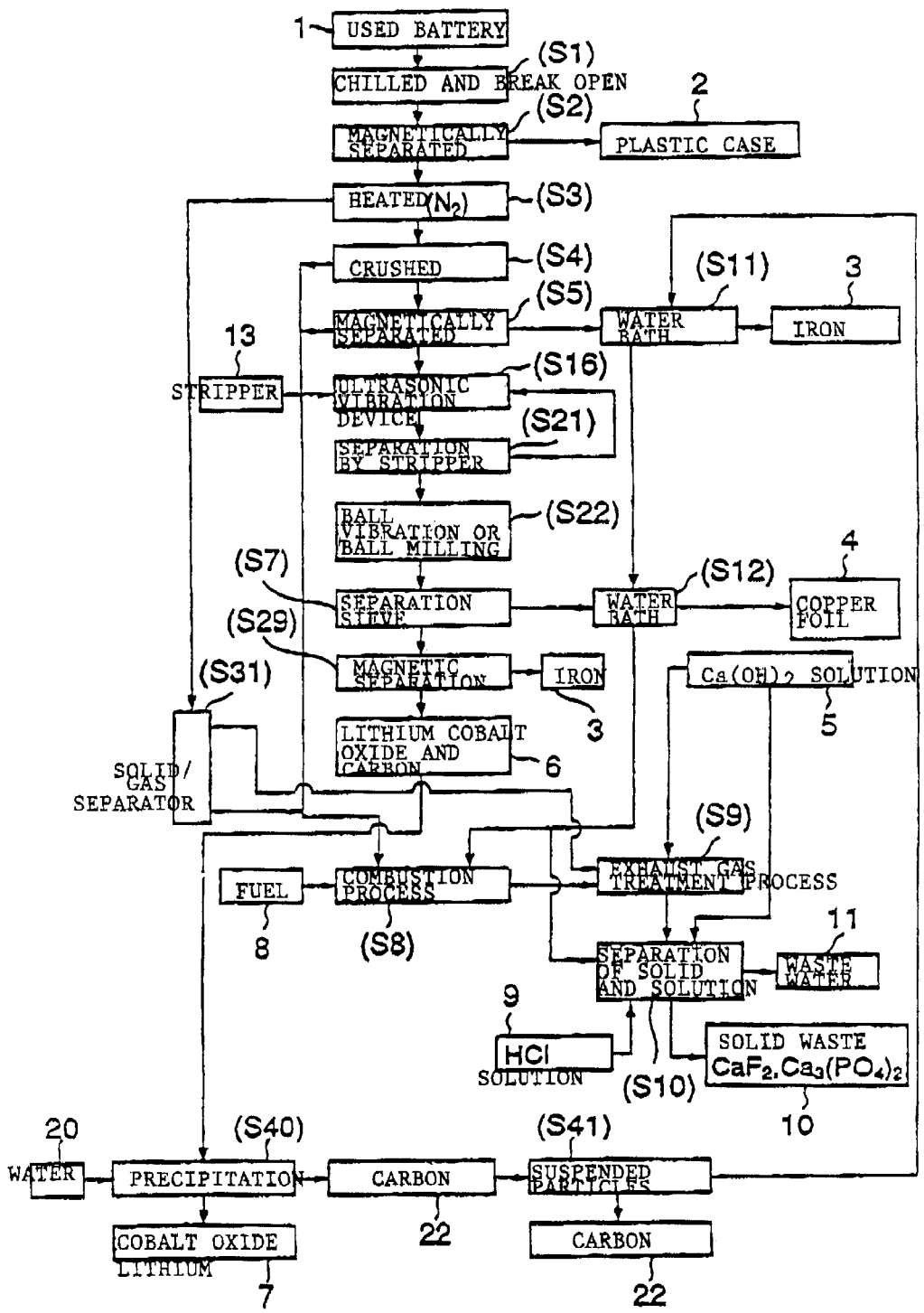
FIG. 20 is a flow chart of a process to dismantle lithium ion batteries which is related to the eleventh preferred embodiment of this invention. Rather than enlarging the size of lithium cobalt oxide and carbon particles and combusting them, this process extracts these materials by sedimentation. This embodiment corresponds to that shown in FIG. 3.

FIGS. 19 and 20 are flow charts of processes to dismantle lithium ion batteries which are related to the tenth and eleventh preferred embodiments of this invention. Rather than enlarging the size of lithium cobalt oxide and carbon particles and combusting them, these processes extract these materials by precipitation. These embodiments corresponds to those shown in FIGS. 2 and 3.

With these embodiments, the ultrasonic vibration in S16 is provided while the material is submerged in water or in an aqueous solution to remove the water-soluble fluoride and phosphoric acid compounds 23. In the precipitation process (S40), the lithium cobalt oxide and carbon in the recovered product can be separated. The harmful water-soluble fluoride and phosphoric acid compounds 23 can be separated from the carbon 22 in an undissolved state by the device to separate suspended particles (S41), and separation processes S40 and S41 are simplified.

The water exhausted from the device to separate suspended particles (S41) may be discharged without further treatment, or it may be returned to water bath process S11 to create a closed loop.

Figure 21:
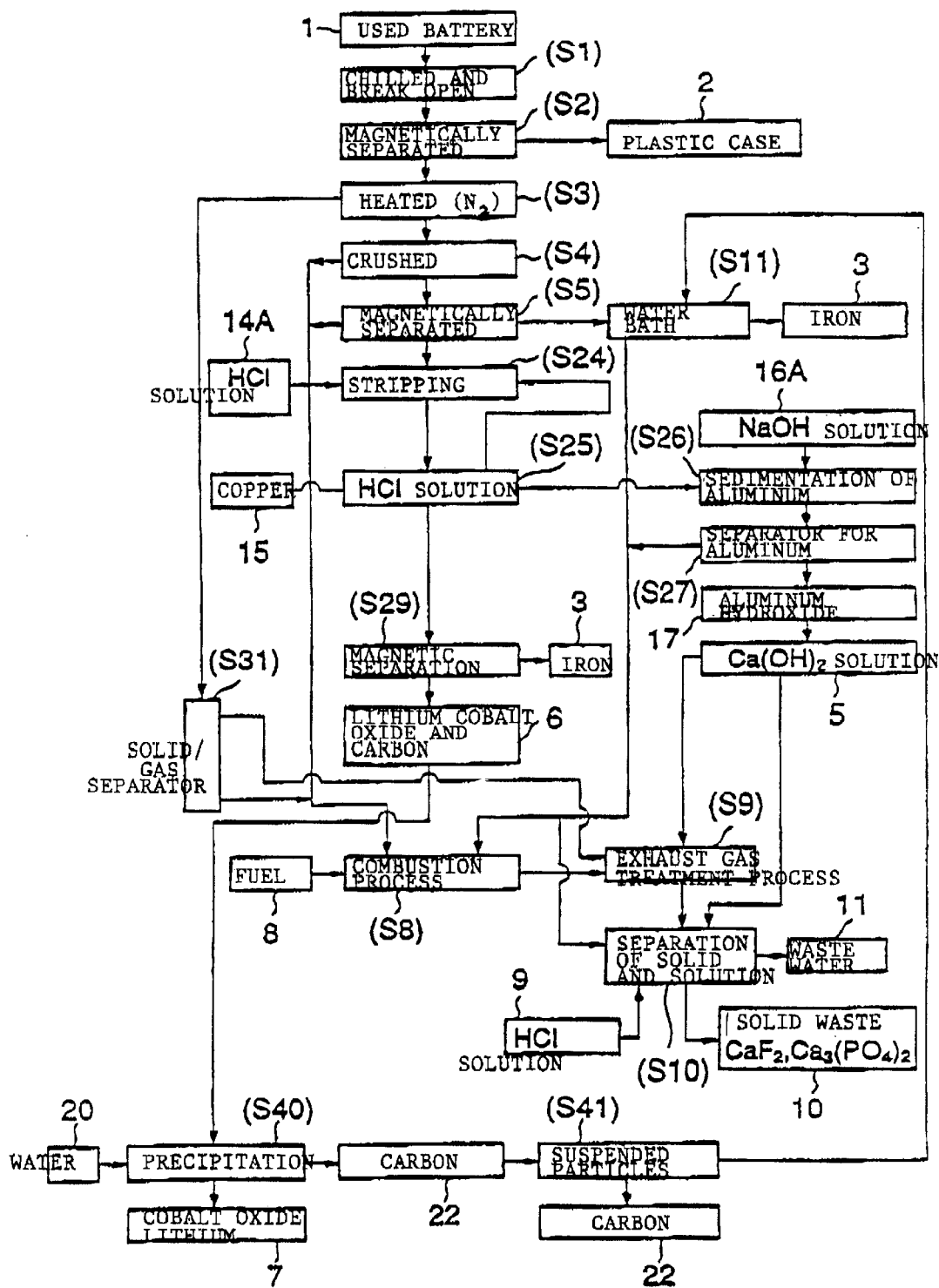
FIG. 21 is a flow chart of a process to dismantle lithium ion batteries which is related to the twelfth preferred embodiment of this invention. Rather than enlarging the size of lithium cobalt oxide and carbon particles and combusting them, this process extracts these materials by sedimentation. This embodiment corresponds to that shown in FIG. 4.

FIG. 21 is a flow chart of a process to dismantle lithium ion batteries which is related to the twelfth preferred embodiment of this invention. This embodiment corresponds to that in FIG. 4. In the fact that it entails a magnetic separation process (S29), a precipitation process (S40), and a process to separate suspended particles (S41), it is identical to the embodiment.

With this embodiment, the water-soluble fluoride and phosphoric acid compounds are removed in a process which uses an HCl solution (S25). A precipitation process (S40) can be used to separate the lithium cobalt oxide and carbon from the recovered product. The harmful water-soluble fluoride and phosphoric acid compounds. can be separated from the carbon 22 in an undissolved state by the device to separate suspended particles (S41), and separation processes S40 and S41 are simplified. The water exhausted from the device to separate suspended particles (S41) may be discharged without further treatment, or it may be returned to water bath process S11 to create a closed loop, just as in the embodiment.

Figure 22:
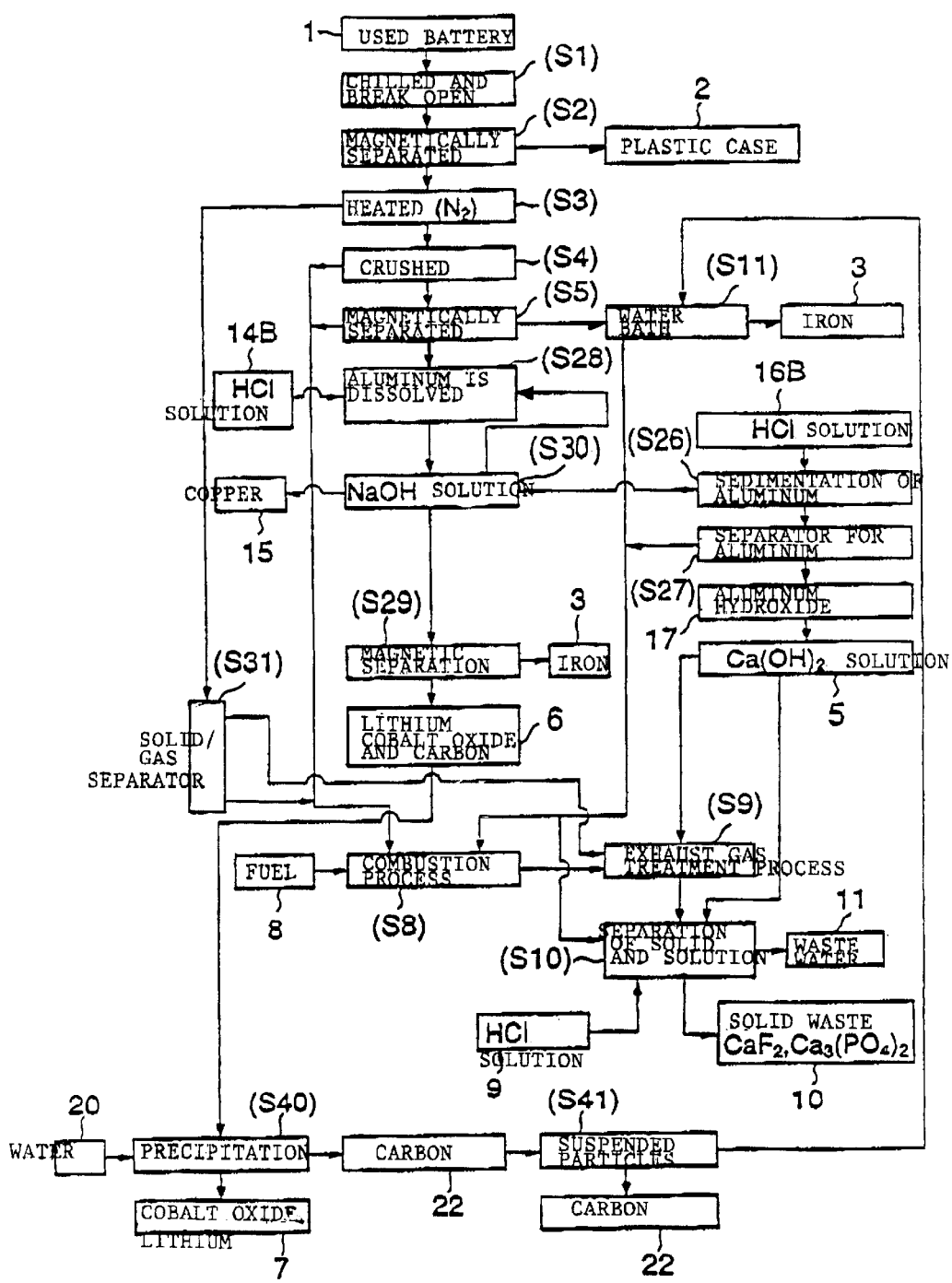
FIG. 22 is a flow chart of a process to dismantle lithium ion batteries which is related to the thirteenth preferred embodiment of this invention. Rather than enlarging the size of lithium cobalt oxide and carbon particles and combusting them, this process extracts these materials by sedimentation. This embodiment corresponds to that shown in FIG. 5.

FIG. 22 is a flow chart of a process to dismantle lithium ion batteries which is related to the thirteenth preferred embodiment of this invention. This embodiment corresponds to that shown in FIG. 5. In the fact that it entails a magnetic separation process (S29), a precipitation process (S40), and a process to separate suspended particles (S41), it is identical to the embodiment.

The water exhausted from the device to separate suspended particles (S41) may be discharged without further treatment, or it may be returned to water bath process S11 to create a closed loop, just as in the embodiment. With this embodiment, after the process in which the aluminum is dissolved (S28), a filter is provided in the process using an NaOH solution (S30) to separate the copper 15. Instead of going through a water bath process (S12) as in FIG. 5, the solution is sent directly to the aluminum precipitation tank (S26).

Figure 23:
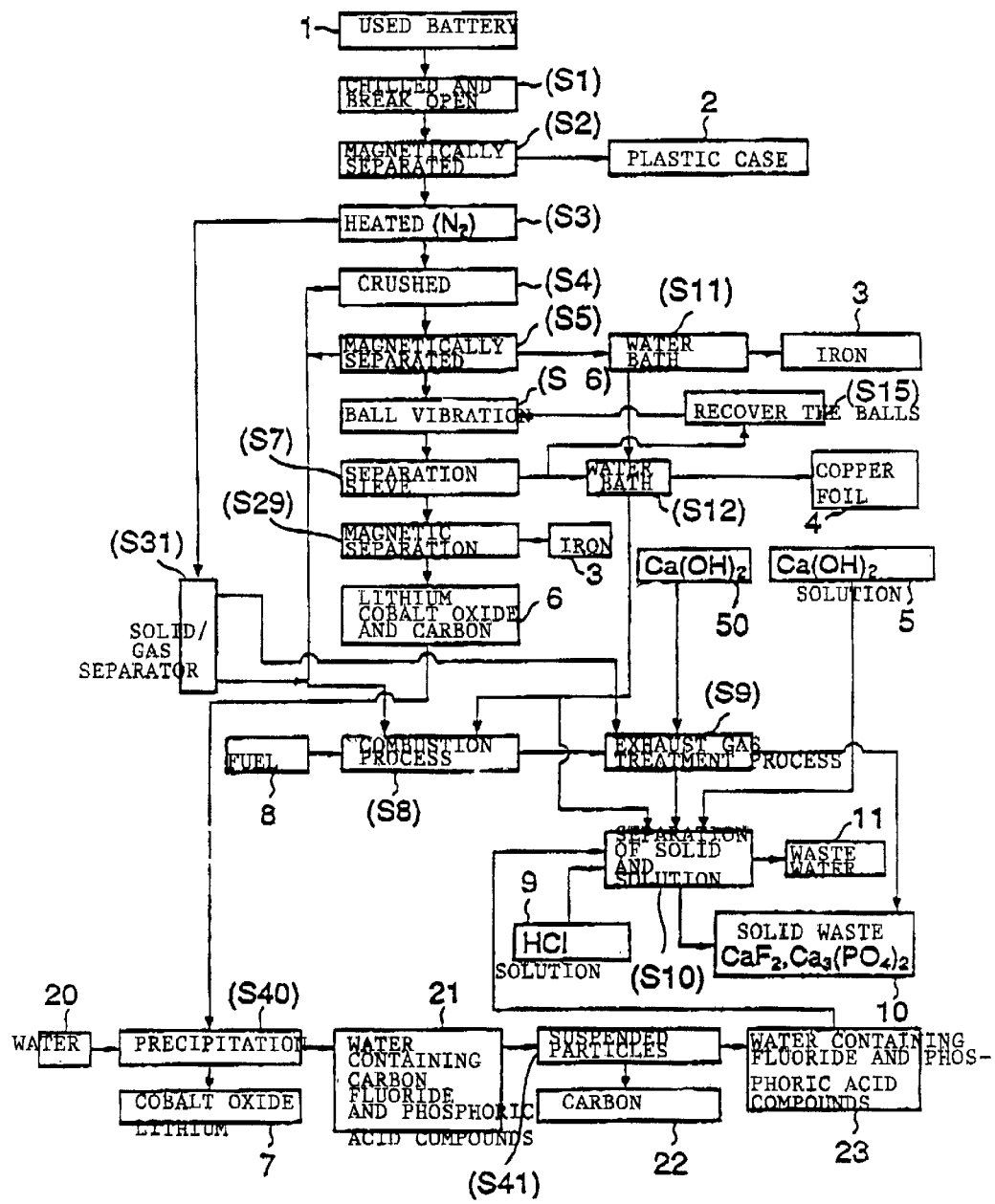
FIG. 23 is a flow chart of a process to dismantle lithium ion batteries which is related to the fourteenth preferred embodiment of this invention. Rather than enlarging the size of lithium cobalt oxide and carbon particles and combusting them, this process extracts these materials by sedimentation. This embodiment corresponds to that shown in FIG. 6.

FIG. 23 is a flow chart of a process to dismantle lithium ion batteries which is related to the fourteenth preferred embodiment of this invention. This embodiment corresponds to that shown in FIG. 6. Since there is no water treatment process upstream from the magnetic separation process (S29), the recovered product contains water-soluble fluoride and phosphoric acid compounds just as the embodiment in FIG. 18 does.

Unlike the embodiment in FIG. 18, here the water exhausted from the device to separate suspended particles (S41), which contains fluoride and phosphoric acid compounds, is sent not to the water bath process but directly to the solid separation process (S10). The compounds solidify as calcium fluoride and calcium phosphate and are thrown away.

Figure 24:
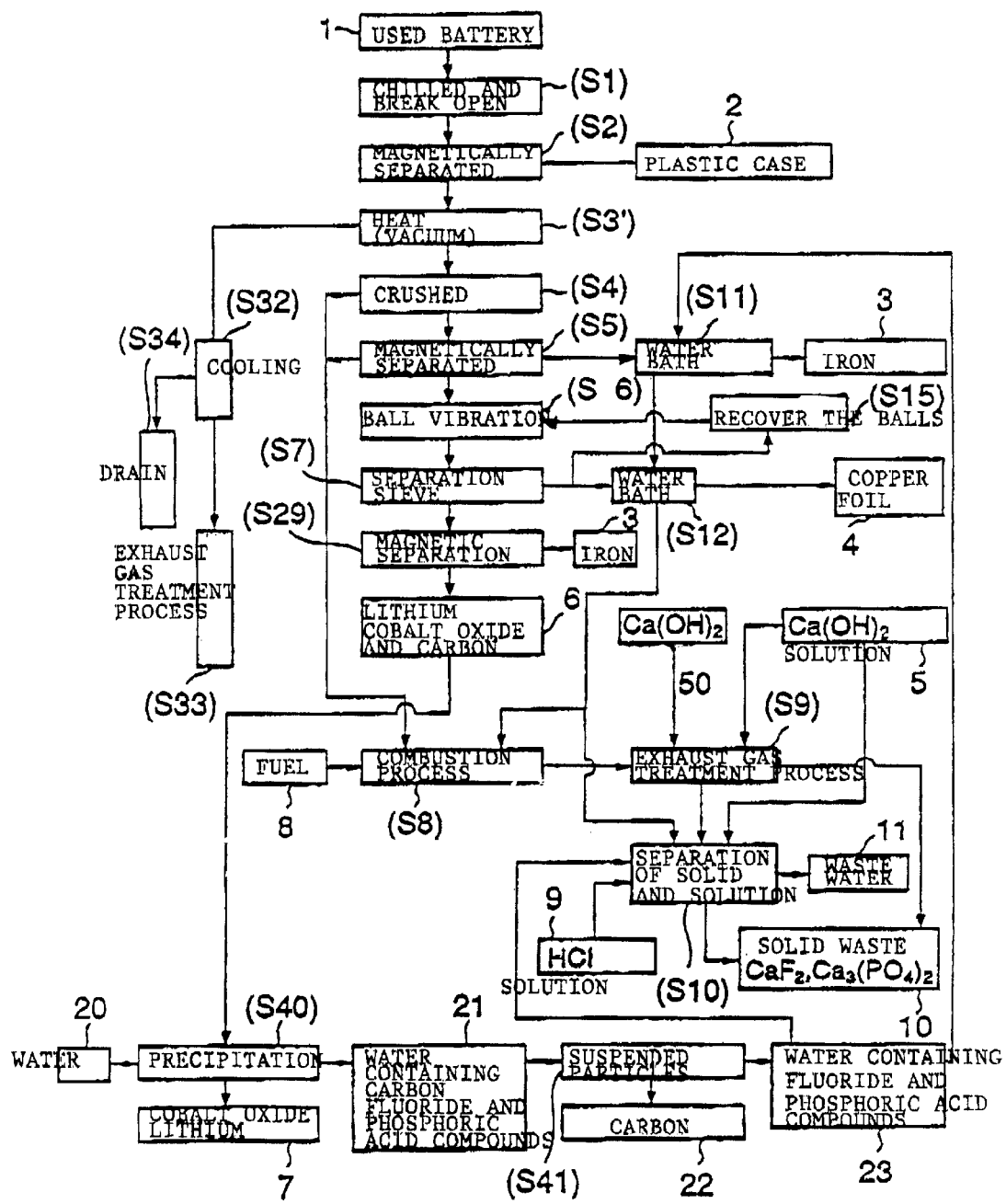
FIG. 24 is a flow chart of a process to dismantle lithium ion batteries which is related to the fifteenth preferred embodiment of this invention. Rather than enlarging the size of lithium cobalt oxide and carbon particles and combusting them, this process extracts these materials by sedimentation. This embodiment corresponds to that shown in FIG. 7.

FIG. 24 is a flow chart of a process to dismantle lithium ion batteries which is related to the fifteenth preferred embodiment of this invention. This embodiment corresponds to that shown in FIG. 7. Other than the fact that the heating process (S3) is executed not in an atmosphere of inert gases, but in a vacuum (S3'), the procedure is identical to that shown in FIG. 18.

Figure 25:
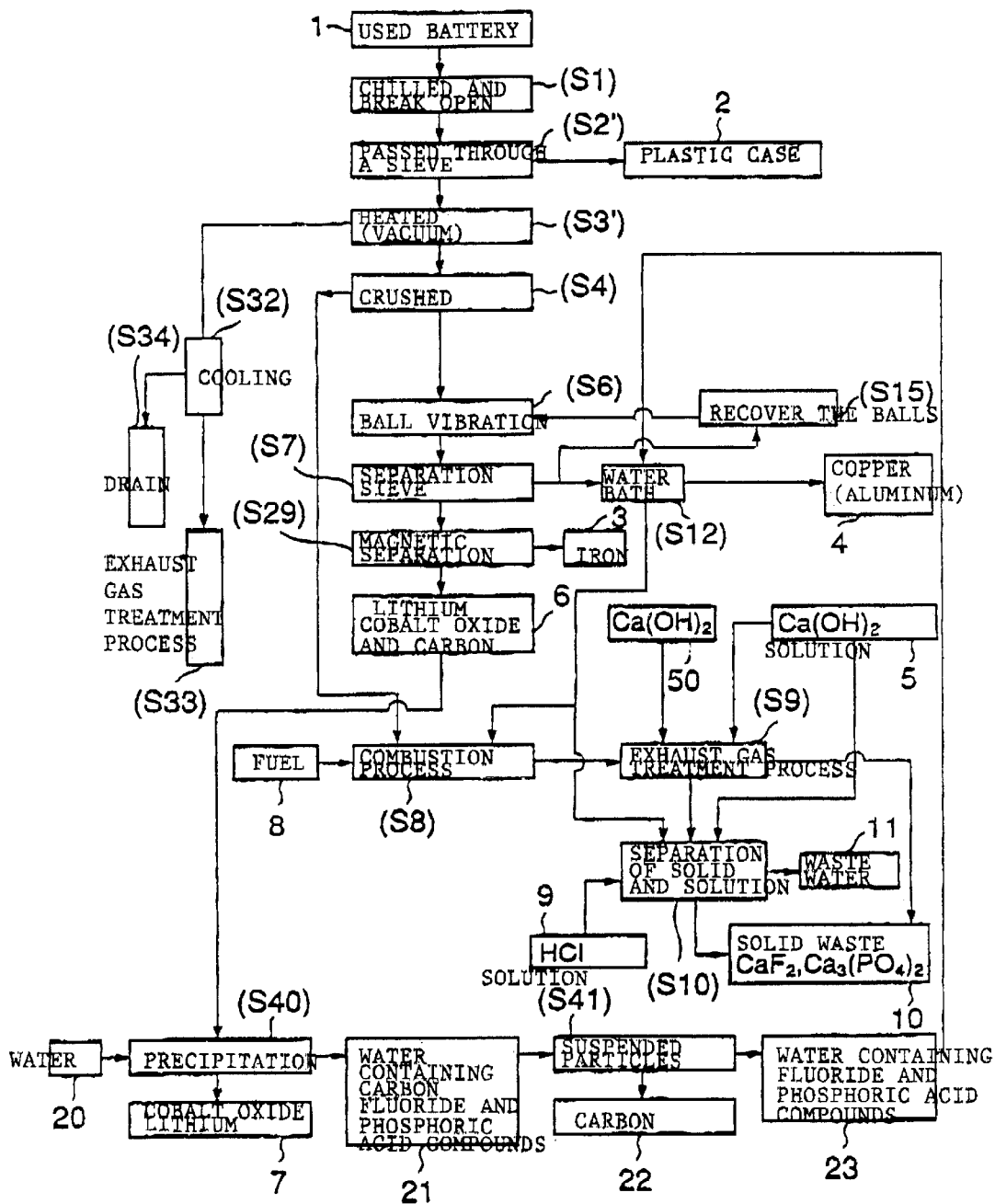
FIG. 25 is a flow chart of a process to dismantle lithium ion batteries which is related to the sixteenth preferred embodiment of this invention. Because here the cell housing is made of aluminum rather than a magnetic material, the battery is chilled and broken open (S1), magnetically separated (S2), and passed through a sieve (S2'). This embodiment corresponds to that shown in FIG. 24.
Figure 26:
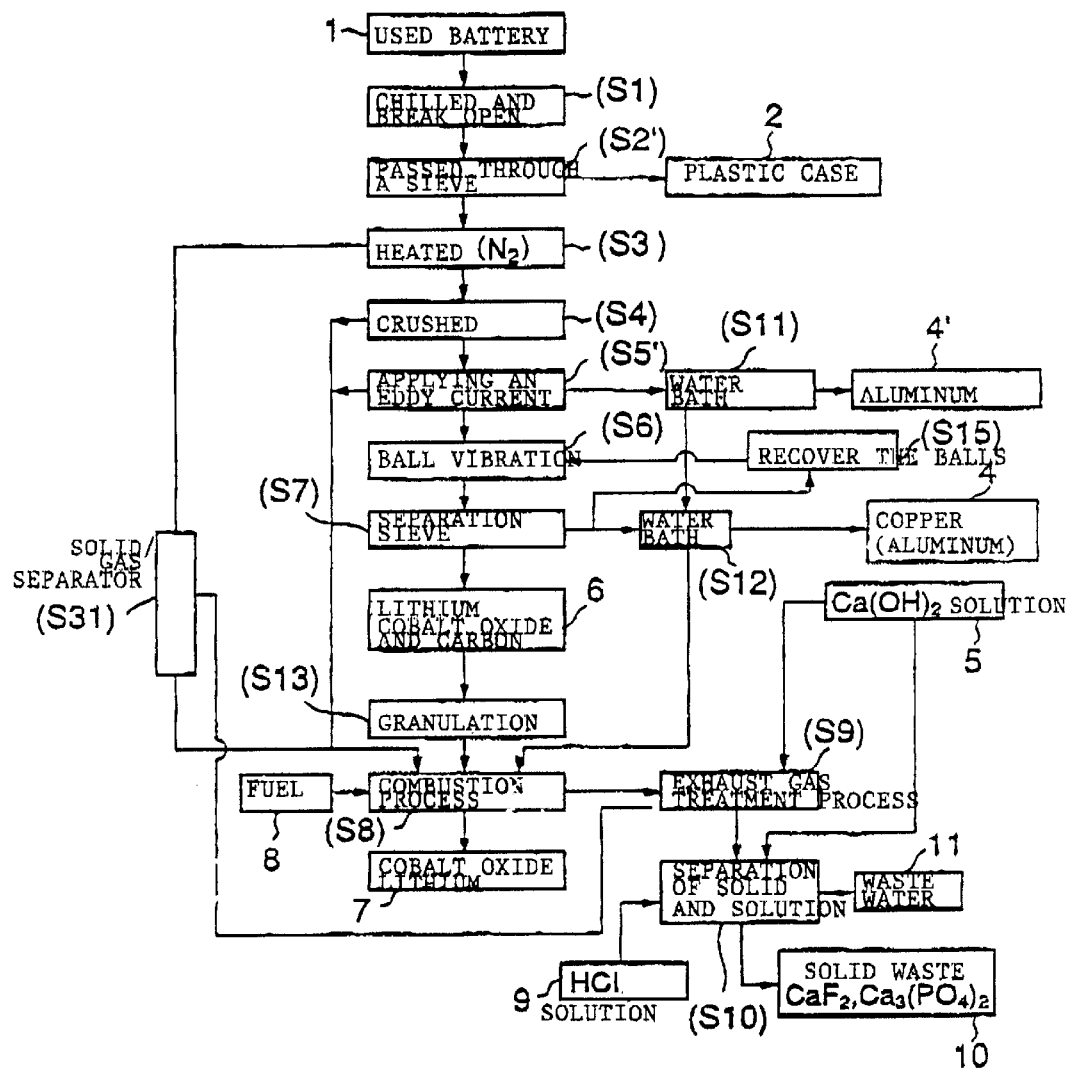
FIG. 26 is a flow chart of a process to dismantle lithium ion batteries which is related to the seventeenth preferred embodiment of this invention. Because here the cell housing is made of aluminum, the battery is chilled and broken open (S1), magnetically separated (S2), and passed through a sieve (S2'). The aluminum is effectively removed by applying an eddy current (S5'). This embodiment corresponds to that shown in FIG. 24 and is an improvement on that in FIG. 25.
Figure 27:
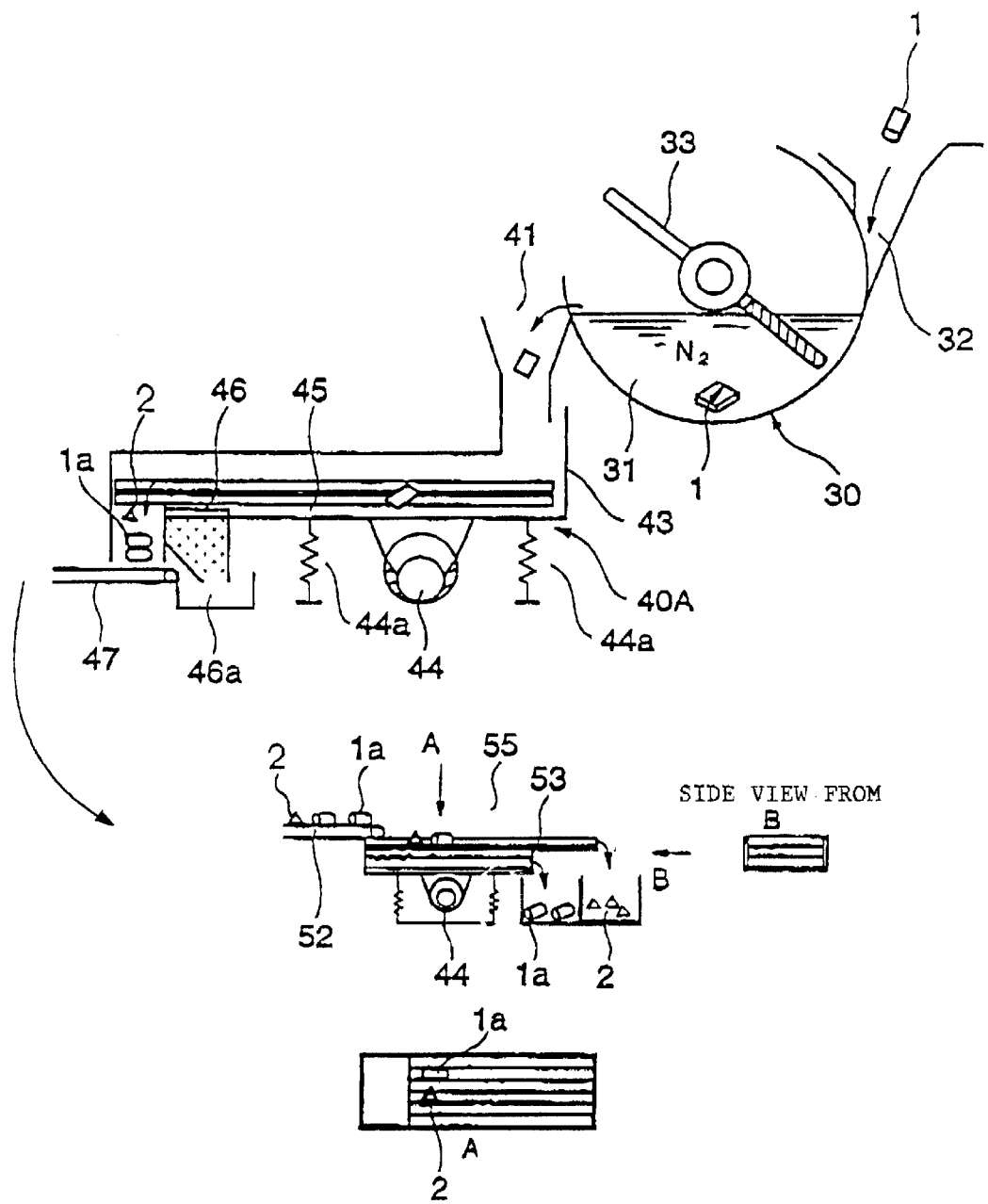
FIG. 27 is a rough sketch of a device to chill and break open batteries so as to separate the sealed battery cell from its plastic case. Afterthe case is separated by rod vibration, the fragments are passed through a sieve (S2').

FIGS. 25 through 27 are embodiments designed for batteries with cell housings that are not made of a ferrous material but of aluminum whose surface is treated with almite. Since the specific gravity differential between plastic and aluminum is small, the cell housings are separated with a sieve.

FIG. 25 is a flow chart of a process to dismantle lithium ion batteries which is related to the sixteenth preferred embodiment of this invention. Because here the cell housing is made of aluminum rather than a magnetic material, the magnetic separation process (S2) executed after the battery is chilled and broken open (S1) in FIG. 24 is replaced with a sieving process (S2') to separate the battery cell from the plastic.

FIG. 27 is a rough sketch of a device to chill and break open the batteries and separate the sealed battery cells from their plastic cases. This device is used in Process 1 in FIGS. 25 and 26. After the cases have been separated by rod vibration, a sieving process (S2') is employed.

In FIG. 27, 30 is a device to chill the batteries. The used battery 1 enters the device through entry port 32 and is submerged in liquid nitrogen 31. It is chilled to −50° C. or lower, and rotary blade 33 propels it through discharge port 41. The battery then enters device 40A, where it is subjected to continuous rod vibration.

In the rod vibration device 40A, vibration generator 44 is actuated with batteries 1 and rods 49A interspersed. Chamber 45, which is supported by spring 44a, is vibrated, and the plastic cases of used batteries 1 are broken open. The fragments resulting from the process fall through perforated screen 46 into receptacle 46a. From the discharge port, they are transported via conveyor belt 52 or sent to vibrating sieve 55. In size separator device 55, which consists of a vibrating sieve, vibration generator 44 imparts vibration to chute 53, which has guide rails to form channels of two specified diameters whereby to separate sealed cells 1a from plastic cases 2.

In the device, then, sealed battery cells 1a with aluminum housings (a non-ferrous material whose specific gravity is not very different from that of plastic) are removed from their plastic cases 2. Taking advantage of the fact that the housings of the sealed battery cells are aluminum, the cells 1a are removed from their cases 2 in a sorting process (S2') which employs a sieve.

FIG. 26 is a flow chart of a process to dismantle lithium ion batteries which is related to the seventeenth preferred embodiment of this invention. Because here the cell housing is made of aluminum, the magnetic separation process (S2) executed after the battery is chilled and broken open (S1) is replaced by a sieving process (S2'). The aluminum is effectively removed by applying an eddy current (S5'). This embodiment corresponds to that shown in FIG. 24 and is an improvement on that in FIG. 25. Because the housing of the sealed battery cell is made of aluminum, the magnetic separation process (S5) executed by separator 70 in the previous embodiments dealing with ferrous housings cannot be used. Instead, an eddy current process (S5') executed by an eddy current device is used to separate the aluminum portion of the sealed battery cell housing from the remainder of the material. In this case, as can be seen in FIG. 25, it would also be acceptable to remove the aluminum cases along with the copper directly by sieving (S7) after the ball vibration process (S6) instead of using the eddy current process (S5').

Effects of the Invention

As has been discussed above, with the inventions disclosed in claims 1 through 5 of this application, the plastic case of the battery is broken open safely and reliably while the battery is left intact, and the sealed battery cell is easily separated from its plastic case. This allows the plastic case which protects sealed battery cell 1a to be removed from the system at the soonest possible moment. The battery is crushed after being heated in an atmosphere of inert gases or a vacuum. This prevents the volatile solvent in the electrolyte solution from igniting and prevents harmful substances from being generated, and it allows just the plastic case to be broken open safely and reliably.

With the invention disclosed in claim 5 of this application, the magnetic nature of the housing, the specific weight differential between the housing and the case, or a sieve is used to achieve reliable separation of sealed battery cell 1a and its plastic case.

With the invention disclosed in claim 7 of this application, a device providing ultrasonic vibration or ball vibration is used to efficiently separate the active material of the positive (or negative) electrode from the metal foil.

With the invention disclosed in claim 8 of this application, a chemical stripper or a combination of a chemical stripper and a vibration device is used to efficiently separate the active material of the positive (or negative) electrode from the metal foil.

With the invention disclosed in claim 9 of this application, a strong acid or strong alkaline solution is used to efficiently separate the active material of the positive (or negative) electrode from the metal foil.

With the invention disclosed in claim 10 of this application, after the powdered material which includes the metal foil and the active material of the positive (or negative) electrode has been sieved, the size of the particles is enlarged to form briquets and thereby facilitate the subsequent combustion.

With the invention disclosed in claim 11 of this application, the lithium hexafluorophosphate 7, a harmful substance, is dissolved in an aqueous solution. This allows the processing system for the solids to remain separate from the system for the solvents. In particular, it removes harmful fluoride compounds and flammable solvents in the electrolyte from the solid processing system. This allows the battery to be dismantled without having to consider the effects of these harmful substances. Once the lithium hexafluorophosphate dissolved in the aqueous solution has hydrolyzed to fluoride ions and phosphate ions, a fixative such as calcium hydroxide is added to the ion solution. Fixing the ions allows them to be processed safely.

With the invention disclosed in claim 14 of this application, the exhaust gas treatment is executed using a dry process. This simplifies the gas treatment equipment and facilitates the wastewater treatment.

With the invention disclosed in claims 17 and 19 of this application, lithium cobalt oxide can be recovered safely, reliably and efficiently even though it is in the form of microscopic particles.

With the invention disclosed in claims 20 through 24 of this application, iron and carbon which are interspersed with the recovered product can be removed efficiently to achieve a highly purified lithium cobalt oxide. With the invention disclosed in claim 23, the fluoride and phosphate ions dissolved in the recovered wastewater can be fixed by adding a fixative such as calcium hydroxide to the aqueous solution. Fixing the ions allows them to be processed safely.

With the invention disclosed in claims 25 through 28 of this application, the invention disclosed in claims 1 and 6 of this application can be implemented effectively.

The invention disclosed in claim 30 of this application includes the separation process disclosed in claims 25 through 28 of this application, in which the battery is repeatedly subjected to vibration and pressure whereby the sealed battery cell is separated from its plastic case. When this process is combined with a prior art crushing process in which the sealed battery cell separated in the process is crushed while being maintained at a temperature below the melting point of the solvent in the electrolyte, the same effect is achieved as with the invention.

When the inventions disclosed in claims 23 through 26 of this application are combined, the lithium hexafluorophosphate separated into the aqueous solution is hydrolyzed into fluoride ions and phosphate ions, and a fixative such as calcium hydroxide is added to the ion solution to fix the ions so they can be processed safely. Various other effects may also be obtained.

What is claimed is:

1. A battery dismantling processing method to process a battery in which one or more sealed battery cells are enclosed within a case made of plastic, said processing method comprising:

a crushing and separation process wherein the battery is cooled to a temperature no greater than −50° C. and subjected to repeated vibration and pressure by a number of objects whose rigidity and specific gravity are greater than those of the plastic in order to separate the battery into a sealed battery cell and a plastic case; and a heating and separation process to heat the sealed battery cell separated in said crushing and separation process to a temperature of at least 200° C. in a non-oxidizing atmosphere such that organic materials subjected to said heating are separated.

2. A battery dismantling processing method according to claim 1, wherein said non-oxidizing atmosphere is a vacuum and said heated organic materials are cooled down and recovered.

3. A battery dismantling processing method according to claim 1, wherein said non-oxidizing atmosphere is in an inert gas and said organic materials existing in a liquid or solid state are further heated in an atmosphere of inert gases or other non-oxidizing gases.

4. A battery dismantling processing method according to claim 3, wherein said inert gases comprise nitrogen, helium, argon or neon.

5. A battery dismantling processing method according to claim 1, wherein said crushing and separation process uses a separation means to separate the battery into the sealed battery cell and the plastic case by detecting magnetic forces or gravity differences, or by using a sieve.

6. A battery dismantling processing method to process a battery in which one or more sealed battery cells are enclosed within a case made of plastic, and positive and negative electrodes of said sealed battery cells are made of a metal sheet coated with active materials of the positive and negative electrodes, said processing method comprising:

a crushing and separation process wherein the battery is cooled to a temperature no greater than −50° C. and subjected to repeated vibration and pressure by a number of objects whose rigidity and specific gravity are greater than those of the plastic in order to separate the battery into the sealed battery cell and a plastic case;

a heating and separation process to heat the sealed battery cell separated in said crushing and separation process to a temperature of at least 200° C. in a non-oxidizing atmosphere such that organic materials are separated; and one or more sorting processes in which useless materials are removed and targeted valuable materials are sorted out in an orderly fashion from crushed fragments produced in said crushing and separation process.

7. A battery dismantling processing method according to claim 6, wherein said sorting processes to sort the targeted valuable materials has a separation process to peel the active materials of the positive and negative electrodes from the metal sheet by vibrating and peeling means using ultrasonic or ball vibration.

8. A battery dismantling processing method according to claim 6, wherein said sorting processes to sort the targeted valuable materials has a separation process to peel the active materials of the positive and negative electrodes from the metal sheet by a stripping agent or by a combination of the stripping agent and vibrating and peeling means.

9. A battery dismantling processing method according to claim 6, wherein said sorting processes to sort the targeted valuable materials has a separation process to peel the active materials of the positive and negative electrodes from the metal sheet by dissolving the metal sheet in a strongly acidic or alkaline solution.

10. A battery dismantling processing method according to claim 6, wherein the active materials are powders, and
said sorting processes to sort the targeted valuable materials has a granulating process to granulate the powders after the metal sheet and powdered active materials of the positive and negative electrodes are separated from each other.

11. A battery dismantling processing method according to claim 6, wherein the battery is a lithium ion battery, and
said heating and separation process has a decomposing process to decompose harmful substances of an electrolyte solution into ion gases containing fluoride and phosphate ion and to dissolve ion gases in the electrolyte solution, and
said sorting process to sort out the targeted valuable materials has a solidifying process to solidify the harmful substances by adding a fixative.

12. A battery dismantling processing method according to claim 11, wherein said flourine compounds comprise hexafluorophosphate.

13. A battery dismantling processing method according to claim 11, wherein said fixative comprises calcium hydroxide.

14. A battery dismantling processing method according to claim 6, wherein the battery is a lithium ion battery, and
said heating and separation process has a decomposing process to decompose harmful substances of an electrolyte solution into ion gases containing fluoride and phosphate ions, and
said sorting process to sort out the targeted valuable materials has a solidifying process to solidify the harmful substances by contact with a fixative.

15. A battery dismantling processing method according to claim 14, wherein said flourine compounds comprise hexafluorophosphate.

16. A battery dismantling processing method according to claim 14, wherein said fixative comprises calcium hydroxide.

17. A battery dismantling processing method according to claim 6, wherein the battery is a lithium ion battery, and
said sorting process to sort out the target valuable materials has a recovery process in which resin components are removed from the battery by a heating process, remaining materials are washed in water, and the active materials of the positive and negative electrodes are dispersed in the water and then recovered from their dispersed state.

18. A battery dismantling processing method according to claim 17, wherein the active materials of said positive and negative electrodes are comprised of microscopic particles of lithium cobalt oxide.

19. A battery dismantling processing method according to claim 6, wherein the active materials are powders and the battery is a lithium ion battery with positive and negative electrodes made of a metal sheet of a material coated with lithium cobalt oxide as the active material, and
said sorting process to sort out the targeted valuable materials has a granulating process to granulate the powders after the metal sheet and powdered active materials of the positive and negative electrodes are separated from each other by a sieve, and
said sorting process has a recovery process to recover lithium cobalt oxide from the granulated powders by combustion.

20. A battery dismantling processing method according to claim 6, wherein said sorting process to sort out the targeted valuable materials has a recovery process to recover iron components magnetically after a particulate mixture containing the metal sheet and the active materials of the positive and negative electrodes has been separated by a sieve.

21. A battery dismantling processing method according to claim 6, wherein
the battery is a lithium ion battery and the metal sheet of the positive and negative electrodes is coated with lithium cobalt oxide as the active material, and
said sorting process to sort out the targeted valuable materials has a recovery process to recover lithium cobalt oxide by sedimentation and to remove carbon after the metal sheet and the active materials of the positive and negative electrodes are separated from each other by a sieve.

22. A battery dismantling processing method according to claim 21, wherein said sedimentation process removes suspended carbon from water remaining from said sedimentation process.

23. A battery dismantling processing method according to claim 21, wherein said sedimentation process has a solidifying process to solidify a solution containing dissolved fluoride or phosphate ions by adding a fixative after the suspended carbon is removed.

24. A battery dismantling processing method according to claim 23, wherein said fixative comprises calcium hydroxide.

25. A battery dismantling processing method according to claim 1 or 6, wherein said crushing and separation process cools down the batteries to a temperature no greater than −50° C. and said objects of greater rigidity and specific gravity than the plastic cool the batteries with vibrations.

26. A battery dismantling processing method according to claim 25, wherein the number of objects applying the vibration have a volume ratio between 0.2 and 1 of the volume of the batteries.

27. A battery dismantling processing method according to claim 1 or 6, wherein said crushing and separation process entails cooling the batteries and a number of objects of greater rigidity and specific gravity than the plastic to a temperature no greater than −50° C. and subjecting the batteries and the objects to vibrations in order to crush and separate the batteries into plastic cases and battery cells.

28. A battery dismantling processing method according to claim 27, wherein
the objects which exert pressure upon the battery have rods with round, elliptical or square cross sections, said rods are chilled to a temperature no greater than −50° C. and rotated within a rotary space, and said vibrations are imparted by the rods to the rotary space.

29. A battery dismantling processing method according to claim 28, wherein said rods are hollow rods.

30. A battery dismantling processing method to process a battery in which one or more sealed battery cells are enclosed within a case made of plastic and positive and negative electrodes of said batteries are made by a metal sheet coated with active materials of the positive and negative electrodes, said process comprising:

a crushing and separation process wherein the battery is cooled to a temperature no greater than −50° C. and subjected to repeated vibration and pressure by a number of objects whose rigidity and specific gravity are greater than those of the plastic in order to separate the battery into the sealed battery cell and a plastic case;

a battery cell crushing process to crush the sealed battery cell separated in said crushing and separation process under the melting point of an organic solvent inside the battery cell; and one or more sorting processes in which useless materials are removed and targeted valuable materials are sorted out in an orderly fashion from crushed fragments produced in said crushing process.

31. A battery dismantling processing method to process a battery in which one or more sealed battery cells are enclosed within a plastic case and said batteries have positive and negative electrodes made of a metal sheet coated with active materials of the positive and negative electrodes and an electrolyte solution containing salts comprised of cations and Lewis acid ions, said process comprising:

a crushing and separation process to separate the battery into a sealed battery cell and a plastic case;

a battery cell crushing process to crush the sealed battery cell separated in said crushing and separation process; and one or more sorting processes in which useless materials are removed and targeted valuable materials are sorted out in an orderly fashion from crushed fragments produced in said crushing process, said sorting processes including a process to separate the salts from the crushed fragments immersed in the electrolyte solution and a process to accelerate hydrolysis of Lewis acid ions separated in the electrolyte solution by adding a heated acid solution to the electrolyte solution, said sorting processes further including a solidifying process to solidify the salts by adding a fixative.

32. A battery dismantling processing method according to claim 31, wherein said sorting processes comprise:

a process to remove the salts in the electrolyte solution from the crushed fragments and into exhaust gases by pyrolysis or combustion;

a process to solidify the salts in the exhaust gases by contacting said salts with a fixative solution; and a solidifying process to accelerate the hydrolysis of the Lewis acid ions separated in the fixative solution by adding a heated acid solution to the fixative solution, and solidifying the salts by adding a fixative.

33. A battery dismantling processing method according to claim 31, wherein said sealed battery cell is a lithium ion battery containing lithium hexafluorophosphate in the electrolyte;

the lithium hexafluorophosphate separated by said sorting process is hydrolyzed into fluorine ions and potassium ions by adding a heated acid solution; and a fixative is added to the ion solution to fix the ions.

34. A battery dismantling processing method according to claim 31, 32, or 33, wherein said heated acid solution is a solution containing HCl, $H_2SO_4$, $HNO_3$, or $HClO_4$, wherein the temperature range of the heated acid between 65° C. and 100° C.

35. A battery dismantling processing method according to claim 32, wherein said fixative comprises calcium hydroxide.

36. A battery dismantling processing method according to claim 33, wherein said fixative comprises calcium hydroxide.

* * * * *